US011625685B2

(12) United States Patent
Kim et al.

(10) Patent No.: US 11,625,685 B2
(45) Date of Patent: Apr. 11, 2023

(54) COMPUTER SYSTEM AND METHOD FOR CONSTRUCTION PROJECT PREQUALIFICATION AND MANAGEMENT

(71) Applicant: Procore Technologies, Inc., Carpinteria, CA (US)

(72) Inventors: Allen Kim, Santa Barbara, CA (US); Tabitha Jewett, Ventura, CA (US); Danielle Sandoval, Santa Barbara, CA (US); Luke Nispel, Los Angeles, CA (US)

(73) Assignee: PROCORE TECHNOLOGIES, INC., Carpinteria, CA (US)

( * ) Notice: Subject to any disclaimer, the term of this patent is extended or adjusted under 35 U.S.C. 154(b) by 233 days.

(21) Appl. No.: 16/593,919

(22) Filed: Oct. 4, 2019

(65) Prior Publication Data

US 2021/0103894 A1   Apr. 8, 2021

(51) Int. Cl.
*G06Q 10/10* (2012.01)
*G06F 40/174* (2020.01)
*G06Q 50/08* (2012.01)

(52) U.S. Cl.
CPC ......... *G06Q 10/103* (2013.01); *G06F 40/174* (2020.01); *G06Q 50/08* (2013.01)

(58) Field of Classification Search
CPC ..... G06Q 10/103; G06Q 50/08; G06F 40/174
(Continued)

(56) References Cited

U.S. PATENT DOCUMENTS 6,301,574 B1 * 10/2001 Thomas ................. G06Q 40/04
 705/37
7,953,663 B1 * 5/2011 LeKachman ........ G06Q 20/108
 705/44
(Continued)

FOREIGN PATENT DOCUMENTS

AU       2009324521 A1 *  7/2011  ............. G06Q 10/00
KR    10-2017-0141166 A     12/2017
(Continued)

OTHER PUBLICATIONS

International Searching Authority International Search Report and Written Opinion dated Jan. 25, 2021, issued in connection with International Application No. PCT/US2020/054044, filed Oct. 2, 2020, 10 pages.
(Continued)

*Primary Examiner* — Manglesh M Patel
(74) *Attorney, Agent, or Firm* — Lee Sullivan Shea & Smith LLP

(57) ABSTRACT

An example software technology may function to both facilitate a prequalification process for construction projects and also leverage the information obtained during the prequalification process to facilitate subsequent management of a construction project. In one aspect, an example prequalification software tool may provide an interface through which a user associated with the GC can create prequalification forms for obtaining prequalification information from subcontractors, where each prequalification form can be tailored for a particular type of construction project, a particular aspect of a construction project being put out to bid or the like. In a further aspect, after a subcontractor has submitted its prequalification submission to the GC, the example prequalification software tool may provide an interface through which a user associated with the GC may review the subcontractor's prequalification submission and
(Continued)

then, if desired, either approve or reject the subcontractor's prequalification submission (or perhaps flag it for follow up).

22 Claims, 42 Drawing Sheets

(58) Field of Classification Search
USPC .................................. 715/221–225; 705/301
See application file for complete search history.

(56) References Cited

U.S. PATENT DOCUMENTS

| | | | |
|---|---|---|---|
| 7,958,042 B2 | 6/2011 | Burns et al. | |
| 8,015,113 B2 | 9/2011 | Petersen et al. | |
| 11,321,791 B1* | 5/2022 | Krause | G06Q 10/06312 |
| 2003/0101127 A1* | 5/2003 | Cornelius | G06Q 40/04 |
| | | | 705/37 |
| 2003/0212627 A1* | 11/2003 | Burns | G06Q 30/08 |
| | | | 705/37 |
| 2003/0225683 A1* | 12/2003 | Hill | G06Q 10/06 |
| | | | 705/37 |
| 2004/0083157 A1* | 4/2004 | Sasser | G06Q 30/02 |
| | | | 705/37 |
| 2006/0155634 A1* | 7/2006 | Woodard | G06Q 30/00 |
| | | | 705/37 |
| 2007/0250769 A1* | 10/2007 | Bass | G06F 40/174 |
| | | | 715/234 |
| 2007/0250783 A1* | 10/2007 | Wu | G06F 40/174 |
| | | | 715/762 |
| 2010/0153280 A1* | 6/2010 | Fox | G06Q 50/188 |
| | | | 709/227 |
| 2010/0153293 A1 | 6/2010 | Fox et al. | |
| 2010/0161495 A1* | 6/2010 | Olson | G06Q 50/165 |
| | | | 705/400 |
| 2011/0131114 A1* | 6/2011 | Al-Mubarak | G06Q 10/06 |
| | | | 705/27.1 |
| 2013/0110704 A1* | 5/2013 | Padron | G06Q 40/025 |
| | | | 705/38 |
| 2014/0207605 A1* | 7/2014 | Allin | G06Q 50/08 |
| | | | 705/26.4 |
| 2021/0004766 A1* | 1/2021 | Mackenzie | G06Q 10/101 |
| 2021/0350310 A1* | 11/2021 | Tashkin | G06Q 10/063118 |

FOREIGN PATENT DOCUMENTS

| | | | | |
|---|---|---|---|---|
| WO | WO-0155943 A1 * | 8/2001 | | G06Q 10/06 |
| WO | WO-03088122 A1 * | 10/2003 | | G06Q 10/06 |

OTHER PUBLICATIONS

Gokhan Arslan et al. Improving sub contractor selection process in construction projects: Web-based sub contractor evaluation system (WEBSES). Elsevier, Automation in Construction, vol. 17, issue 4, May 2008, pp. 480-488. pp. 480-487.

SqFt. Subcontractor Software—Find More Project Leads. [online], [retrieved on Oct. 7, 2019]. Retrieved from the Internet: <https://www.isqft.com/start/subcontractors/>.

PipelineSuite. Software to Build On. [online], [retrieved on Oct. 7, 2019]. Retrieved from the Internet: <https://pipelinesuite.com/>.

SmartBid. Simplify Your Bid Process. [online], [retrieved on Oct. 7, 2019]. Retrieved from the Internet: <https://try.smartbid.co/construction-bid-management.html>.

Oracle. Textura Construction and Engineering. [online], [retrieved on Oct. 7, 2019]. Retrieved from the Internet: <https://www.oracle.com/applications/primavera/products/textura-payment-management/>.

Building Connected. TradeTapp. [online], [retrieved on Oct. 7, 2019]. Retrieved from the Internet: <https://www.buildingconnected.com/tradetapp/>.

Abioye, Sofiat O. et al., "Artificial Intelligence in the Construction Industry: A Review of Present Status, Opportunities and Future Challenges", Journal of Building Engineering, vol. 44, Oct. 5, 2021, 13 pages.

* cited by examiner

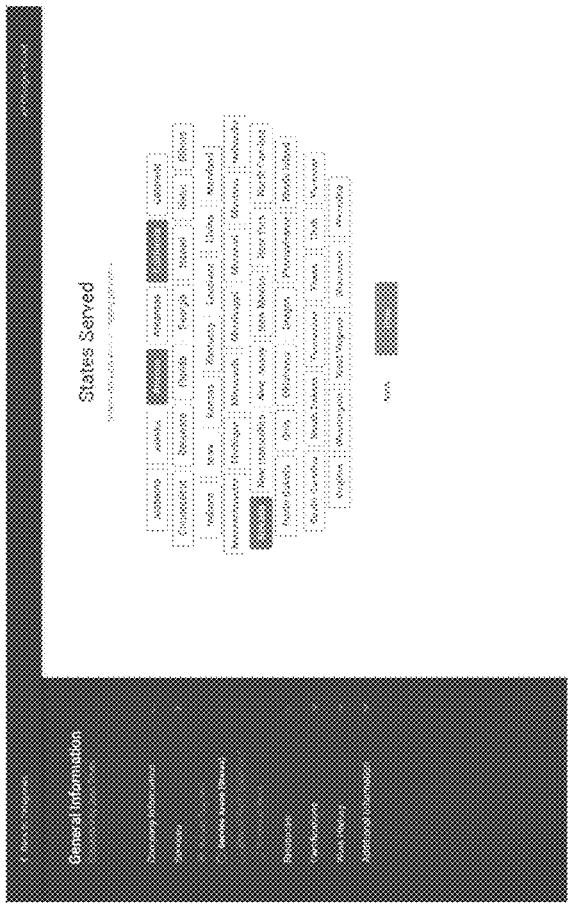

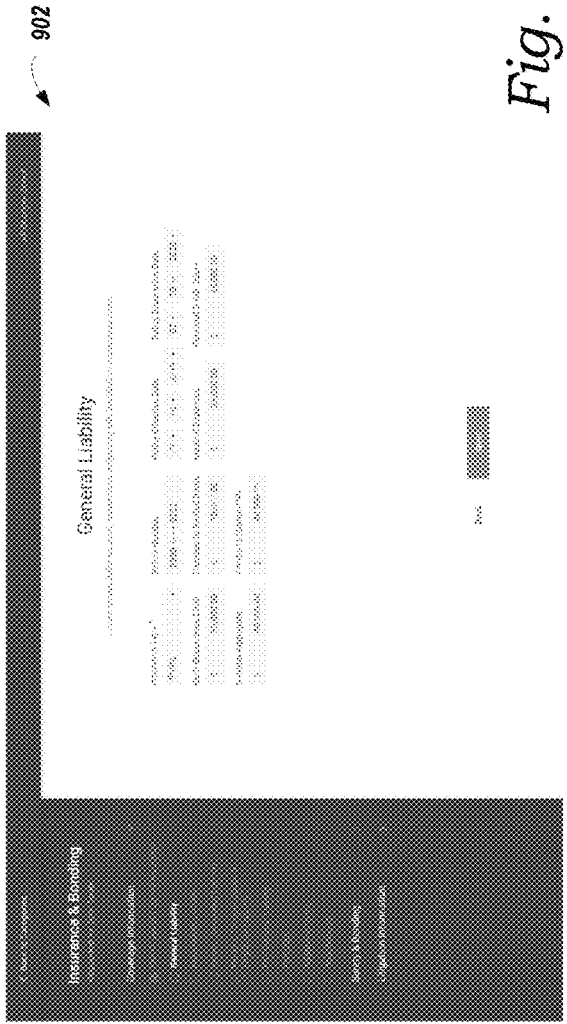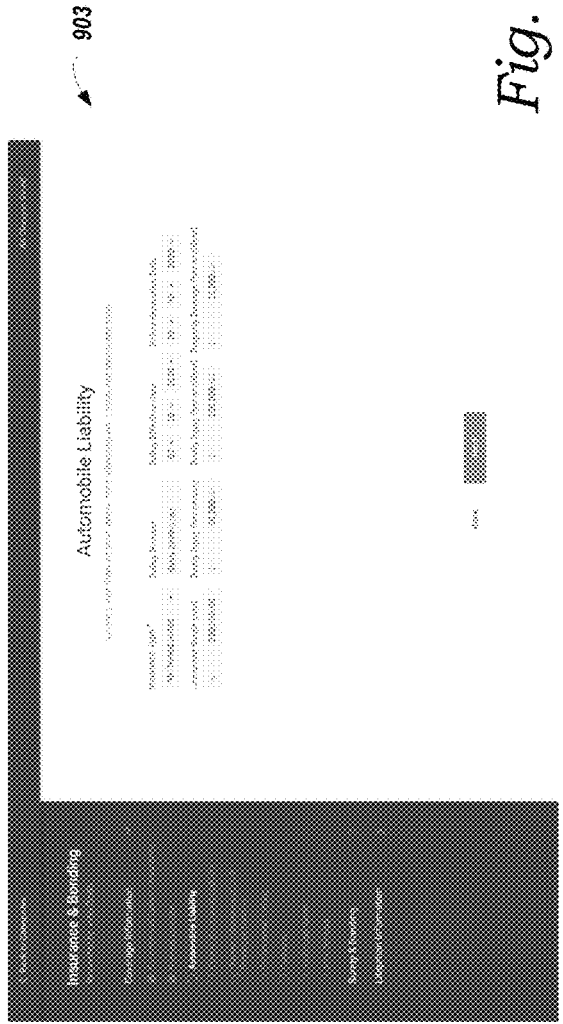
Fig. 9B
Fig. 9C

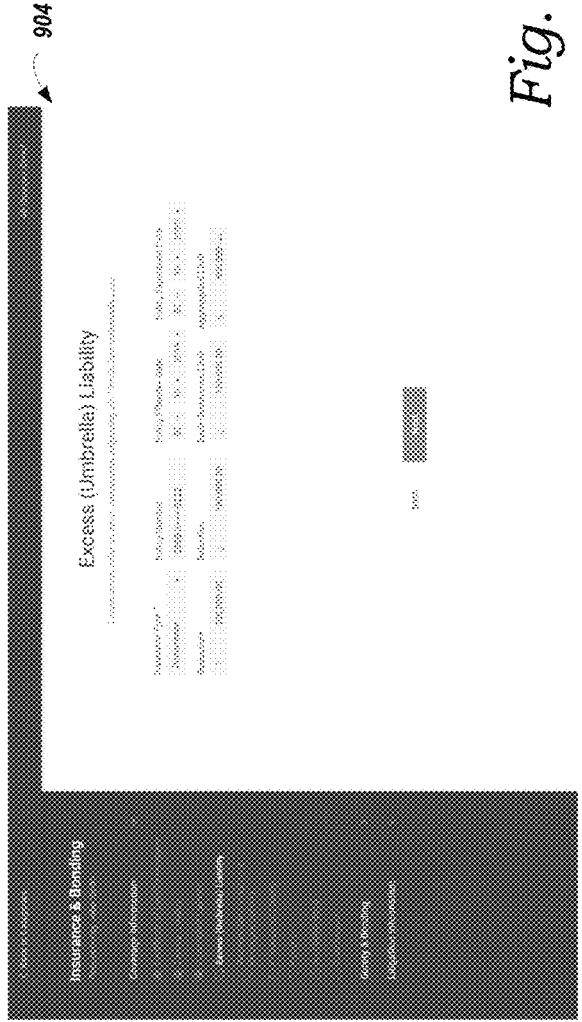

COMPUTER SYSTEM AND METHOD FOR CONSTRUCTION PROJECT PREQUALIFICATION AND MANAGEMENT

BACKGROUND

Construction projects can be massive endeavors involving multiple different parties. For instance, there may be an owner who is funding the project, a general contractor ("GC") who manages the overall construction project, and numerous subcontractors who provide labor and materials to the GC to build the project. Typically, an owner may enter into a "prime contract" with a GC that outlines the GC's responsibilities for the project and the fees that the owner will pay to the GC. In turn, a GC may enter into subcontracts with various different subcontractors to work on various different aspects of the construction project. For example, a GC may engage a first subcontractor to handle a first aspect of the construction project (e.g., concrete), a second subcontractor to handle a second aspect of the construction project (e.g., carpentry), and so on.

In practice, a GC will often put a particular subcontract for a construction project "out to bid," in the sense that the GC may allow a number of different subcontractors to submit bids to handle a particular aspect of the construction project (e.g., concrete, carpentry, etc.). However, before allowing any subcontractor to bid on a construction project being managed by a GC, the GC typically puts the subcontract through a "prequalification" process during which the subcontractor provides a litany of different information that enables the GC to determine whether the subcontractor meets the GC's baseline requirements for working on construction projects being managed by the GC. This prequalification information may take various different forms, examples of which may include financial information (e.g., cash flow, total revenue, etc.), safety information (e.g., number of safety incidents during a given timeframe), insurance information, and/or general business information, such as licenses, certifications, and the like.

If the GC determines as a result of this prequalification process that the subcontractor meets the GC's baseline requirements, the GC may then allow the subcontractor to formally submit a bid for a subcontract on one or more construction projects being managed by the GC.

OVERVIEW

Conventionally, the contractor or subcontractor prequalification process has been a cumbersome and time consuming activity. Indeed, this process has typically required a solicitor, such as a GC, to identify and seek out a number of different subcontractors that are possible candidates for submitting bids on construction projects being managed by the GC, request certain information from each of these different subcontractors, subsequently receive the requested information from each of the different subcontractors at various different times and perhaps through various different communication channels (e.g., telephone, postal mail, email, etc.), collect and evaluate the information received from each of the different subcontractors, and then communicate the results of the GC's evaluation back to each of the different subcontractors.

More recently, software tools have been developed to help streamline the subcontractor prequalification process, where such software tools generally take the form of a web-based form (or the like) that enables candidate subcontractors to provide relevant information to a GC, which may in turn evaluate the information provided by the candidate subtractors and then approve or reject the candidate subcontractors for purposes of submitting bids on construction projects being managed by the GC. However, these existing software tools are still rudimentary and have several limitations.

To help improve upon these existing software tools and their inherent limitations, disclosed herein is software technology that functions to both facilitate a prequalification process for construction projects and also leverage the information obtained during the prequalification process (referred to herein as "prequalification information") to facilitate subsequent management of a construction project. For purposes of illustration, the disclosed software technology is described below in the context of a GC engaging in a prequalification process for subcontractors, but it should be understood that the disclosed software technology is applicable to any party that solicits bids and/or initiates the prequalification process (whether they take the form of a GC or otherwise) and any party that submits bids (whether they are a contractor, subcontractor, or otherwise) and as such may be used in connection with other types of prequalification processes as well (e.g., prequalification of GCs by an owner or architect). In this respect, the party that solicits bids and/or initiates the prequalification process in order to prequalify others to work on construction projects may generally be referred to as the "initiator" and the parties that are submitting information and being evaluated as part of the prequalification process may generally be referred to as "submitters."

As described in further detail below, the disclosed software technology includes a software tool for facilitating a prequalification process (referred to herein as a "prequalification software tool") that improves upon existing software tools. This disclosed prequalification software tool may include various aspects and take various forms.

For instance, in one aspect, the disclosed prequalification software tool may provide an interface through which a user associated with the GC can create prequalification forms for obtaining prequalification information from subcontractors, where each prequalification form can be tailored for a particular type of construction project, a particular aspect of a construction project being put out to bid (e.g., concrete, carpentry, etc.), or the like.

In another aspect, after a user associated with a GC has created a prequalification form via the disclosed prequalification software tool, the disclosed prequalification software tool may invite a given set of one or more subcontractors to participate in the GC's prequalification process by filling out the GC's prequalification form. In this respect, the given set of one or more subcontractors that are invited to fill out the GC's prequalification form may be specified by a user associated with the GC and/or may be selected by the prequalification software tool based on certain criteria associated with the GC's prequalification form, among other possibilities.

In yet another aspect, after a subcontractor receives an invitation to fill out a GC's prequalification form, the disclosed prequalification software tool may provide an interface through which a user associated with the subcontractor can populate the GC's prequalification form with the subcontractor's prequalification information and then submit that completed version of the prequalification form back to the GC, which may serve as the subcontractor's submission to be prequalified by the GC.

In still another aspect, after a subcontractor has provided its prequalification submission to the GC, the disclosed prequalification software tool may apply certain rules to the subtractor's prequalification information that at least partially govern whether or not the subcontractor's prequalification submission is approved or rejected. These rules may take various different forms.

As one possibility, the disclosed prequalification software tool may be configured to apply a rule for evaluating an individual field of the prequalification information submitted by a subcontractor. For instance, one example of a rule for evaluating an individual field of prequalification information may dictate that the prequalification software tool is to automatically reject a subcontractor's prequalification submission (or at least flag the subcontractor's prequalification submission for further review) if the total revenue entered by the subcontractor is below a given revenue amount. Another example of a rule for evaluating an individual field of prequalification information may dictate that the prequalification software tool is to automatically reject a subcontractor's prequalification submission (or at least flag the subcontractor's prequalification submission for further review) if the number of safety incidents entered by the subcontractor is above a given number. A rule for evaluating an individual field of prequalification information may take various other forms as well.

As another possibility, the disclosed prequalification software tool may be configured to apply a rule for evaluating a group of multiple fields of the prequalification information submitted by a subcontractor via one or more logical operators (e.g., an AND operator, OR operator, etc.). For instance, one example of a rule for evaluating a group of multiple fields of prequalification information may dictate that the prequalification software tool is to automatically reject a subcontractor's prequalification submission (or at least flag the subcontractor's prequalification submission for further review) unless (a) the total revenue entered by the subcontractor is above a given revenue amount AND (b) the number of safety incidents entered by the subcontractor is below a given number. Or on the other hand, another example of a rule for evaluating a group of multiple fields of prequalification information may dictate that the prequalification software tool is to automatically accept a subcontractor's bid prequalification submission if (a) the total revenue entered by the subcontractor is above a given revenue amount AND (b) the number of safety incidents entered by the subcontractor is below a given number. A rule for evaluating a group of multiple fields of prequalification information may take various other forms as well.

The rules that may be applied by the disclosed prequalification software tool to a subcontractor's prequalification information may take other forms as well. For instance, as one possibility, certain rules applied by the disclosed prequalification software tool may evaluate other information about a subcontractor in addition (or in alternative) to the subcontractor's prequalification information when determining whether to approve or reject the subcontractor's prequalification submission. For example, to the extent that a subcontractor has a preexisting account with the provider of the prequalification software tool, a given rule applied by the disclosed prequalification software tool may evaluate certain information stored under the subcontractor's preexisting account (e.g., historical financial or safety information for the subcontractor) when determining whether to approve or reject the subcontractor's prequalification submission. The information evaluated and/or the criteria applied by such rules may take various other forms as well.

Further, in practice, the rules that may be applied by the disclosed prequalification software tool to a subcontractor's prequalification information may be defined based on input from the GC, predefined by the provider of the software tool, and/or derived based on a computing system's analysis of historical data, among other possibilities.

In a further aspect, after a subcontractor has submitted its prequalification submission to the GC, the disclosed prequalification software tool may provide an interface through which a user associated with the GC may review the subcontractor's prequalification submission and then, if desired, either approve or reject the subcontractor's prequalification submission (or perhaps flag it for follow up). As part of this functionality, the GC's approval of the subcontractor may also be accompanied by certain limitations on the subcontractor (e.g., a maximum dollar amount that the subcontractor is approved for), which may be specified by a user associated with the GC and/or may be determined by the disclosed prequalification software tool based on subcontractor's prequalification information, among other possibilities.

The disclosed prequalification software tool may include various aspects as well.

Further, the disclosed prequalification software tool may be implemented in various manners. For instance, as one possibility, the disclosed prequalification software tool may be implemented as a single, standalone tool for prequalifying subcontractors (or other parties) to work on construction projects.

Alternatively, as another possibility, the disclosed prequalification software tool may be implemented as part of a suite of software tools that have been developed to assist with the task of managing construction projects. For instance, Procore Technologies, Inc. ("Procore") has developed a construction management software application that includes a suite of different software tools for facilitating the management of construction projects—examples of which may include a "Punch List" tool that facilitates management of punch items, a "Daily Log" tool that facilitates management of daily activities (e.g., labor, communication, equipment, materials, etc.), an "Invoicing" tool that facilitates management of invoicing, a "Commitments" tool that facilitates management of contracts and purchase orders, and a "Change Orders" tool that facilitates management of change orders, among many others—and it is possible that the disclosed prequalification software tool may be implemented as one of the tools included within Procore's construction management software application. The disclosed prequalification software tool may be implemented in other manners as well.

Advantageously, by implementing the disclosed prequalification software tool as part of a suite of construction management software tools, the prequalification information that is obtained via the disclosed prequalification software tool can also be leveraged by the other construction management software tools in the suite to help improve the other construction management tasks facilitated by these tools. In this respect, the software technology disclosed herein also includes a software engine that is configured to evaluate the prequalification information submitted by an approved subcontractor via the disclosed prequalification software tool, and then based on that evaluation, automatically configure aspects of one or more other software tools that are used by the GC and/or the subcontractor to facilitate management of a construction project.

For instance, as one possibility, the disclosed software engine may evaluate the financial information submitted by an approved subcontractor as part of its prequalification submission, and if the software engine determines that the subcontractor's financial information does not meet certain criteria (e.g., the subcontractor's cash flow is below a certain amount), the software engine may then automatically configure an "Invoicing" tool used by the GC to employ a more-frequent invoicing schedule (e.g., bi-weekly rather than 45 days) for invoices directed to the approved subcontractor.

As another possibility, the disclosed software engine may evaluate the safety information submitted by an approved subcontractor as part of its prequalification submission, and if the software engine determines that this safety information does not meet certain criteria (e.g., the number of safety incidents experienced by the subcontractor during a given timeframe exceeds a certain number), the software engine may then automatically configure certain software tools for tracking the subcontractor's work on a construction project (e.g., a "Punch Item" tool and/or a "Daily Log" tool) to require that additional safety actions be completed by the approved subcontractor while working on the construction project.

As yet another possibility, the disclosed software engine may evaluate the insurance information submitted by an approved subcontractor as part of its prequalification submission, and if the software engine determines that this insurance information is outdated or incomplete, the software engine may automatically configure a "Commitments" tool used by the GC to prevent a payment from being made to the approved subcontractor until the subcontractor updates the insurance information.

The information that may be evaluated by the disclosed software engine, the software tools that may be automatically configured by the disclosed software engine, and/or the manner in which the software tools may be automatically configured based on the subcontractor's prequalification information may take various other forms as well. For instance, as one possibility, the disclosed software engine may be configured to evaluate other information about an approved subcontractor in addition (or in alternative) to the prequalification information when determining whether to automatically configure aspects of one or more other software tools that facilitate management of a construction project.

For example, to the extent that some limitation has been imposed by a GC on a subcontractor in connection with the GC's approval of that subcontractor, the disclosed software engine may function to automatically configure a "Change Orders" tool used by the GC and the subcontractor to prevent approval of a change order submitted by the subcontractor if that change order would violate the limitations imposed by the GC on the subcontractor. As another example, to the extent that an approved subcontractor has a preexisting account with the provider of a suite of construction management software tools, the disclosed software engine may evaluate certain information stored under the subcontractor's preexisting account (e.g., historical financial or safety information for the subcontractor) when determining whether to automatically configure certain software tools for managing the subcontractor's work on a construction project being managed by the GC. The information about a subcontractor that is evaluated by the disclosed software engine may take other forms as well.

Further, in practice, the criteria used by the disclosed software engine when determining whether to automatically configure aspects of one or more other software tools may be defined based on input from the GC, predefined by the provider of the suite of software tools, and/or derived based on a computing system's analysis of historical data, among other possibilities.

Certain variations on the functions performed by the disclosed software engine are possible as well. For instance, in some embodiments, the disclosed software engine may present a user associated with the GC with an opportunity to approve or reject a proposed change to the configuration of a software tool before implementing that change to the software tool. For example, before changing the invoice schedule used by an "Invoicing" tool for a subcontractor or adding safety actions that are required by a "Punch List" or "Daily Activities" tool for a subcontractor, the disclosed software engine may present a user associated with the GC with the option to approve or reject these changes.

The disclosed software engine may perform other functions and/or take other forms as well.

By leveraging an approved subcontractor's prequalification information in this manner, the disclosed software technology may improve a GC's ability to mitigate the real-world risk presented by a given subcontractor that is working on a construction project being managed by the GC, among various other advantages.

One of ordinary skill in the art will appreciate these as well as numerous other aspects in reading the following disclosure.

BRIEF DESCRIPTION OF THE DRAWINGS

FIG. 3B depicts an example snapshot of an interface that may be presented to a user in accordance with one embodiment.

FIG. 3C depicts an example snapshot of an interface that may be presented to a user in accordance with one embodiment.

FIG. 6A depicts an example snapshot of an interface that may be presented to a user in accordance with one embodiment.

FIG. 6B depicts an example snapshot of an interface that may be presented to a user in accordance with one embodiment.

FIG. 7A depicts an example snapshot of an interface that may be presented to a user in accordance with one embodiment.

FIG. 7B depicts an example snapshot of an interface that may be presented to a user in accordance with one embodiment.

FIG. 7E depicts an example snapshot of an interface that may be presented to a user in accordance with one embodiment.

FIG. 7F depicts an example snapshot of an interface that may be presented to a user in accordance with one embodiment.

FIG. 911 depicts an example snapshot of an interface that may be presented to a user in accordance with one embodiment.

FIG. 12 depicts an example snapshot of an interface that may be presented to a user in accordance with one embodiment.

FIG. 15A depicts an example snapshot of an interface that may be presented to a user in accordance with one embodiment.

FIG. 15B depicts an example snapshot of an interface that may be presented to a user in accordance with one embodiment.

FIG. 20A depicts an example snapshot of an interface that may be presented to a user in accordance with one embodiment.

FIG. 20B depicts an example snapshot of an interface that may be presented to a user in accordance with one embodiment.

DETAILED DESCRIPTION

The following disclosure makes reference to the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners, each of which is contemplated herein.

I. EXAMPLE SYSTEM CONFIGURATION

As described above, the present disclosure is generally directed to software technology that functions to both facilitate a prequalification process for construction projects and also leverage the information obtained during the prequalification process (referred to herein as "prequalification information") to facilitate subsequent management of a construction project. For purposes of illustration, the disclosed software technology is described below in the context of a GC engaging in a prequalification process for subcontractors, but it should be understood that the disclosed software technology may be used in connection with other types of prequalification processes as well (e.g., prequalification of GCs by an owner or architect). In this respect, the party that initiates the prequalification process in order to prequalify others to work on construction projects may generally be referred to as the "initiator" and the parties that are submitting information and being evaluated as part of the prequalification process may generally be referred to as "submitters."

The software technology disclosed herein may be embodied in various manners. For instance, as one possibility, the disclosed software technology may be integrated into in a software as a service ("SaaS") application for assisting with construction management, which may include a front-end software component running on a party's client station and a back-end software component running on a back-end platform that is accessible to the party's client station via a communication network such as the Internet. However, the software technology disclosed herein may be embodied in other manners as well.

Figure 1:
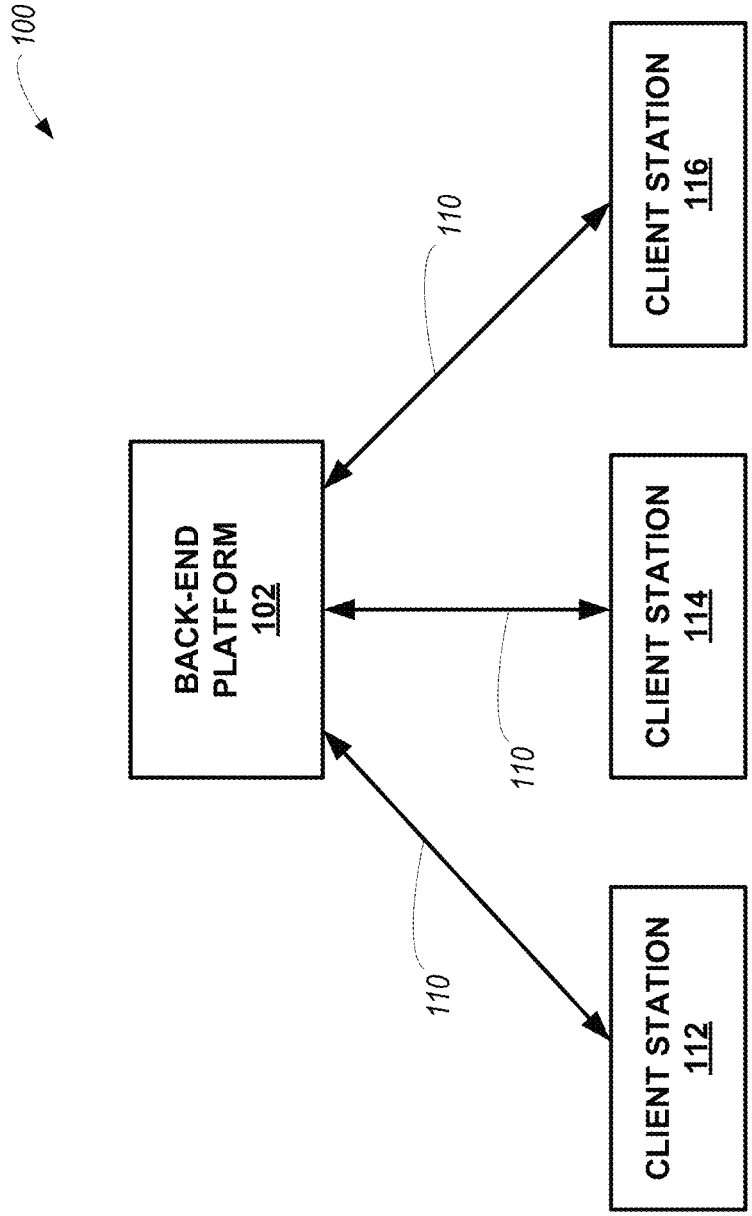
FIG. 1 depicts an example network configuration in which example embodiments may be implemented.

Turning now to the figures, FIG. 1 depicts an example network configuration 100 in which example embodiments of the present disclosure may be implemented. As shown in FIG. 1, network configuration 100 includes a back-end platform 102 that may be communicatively coupled to one or more client stations, depicted here, for the sake of discussion, as three client stations 112, 114, and 116.

In general, back-end platform 102 may comprise one or more computing systems that have been provisioned with software for carrying out one or more of the platform functions disclosed herein for driving a construction management SaaS application, including but not limited to functions related to establishing a connection between different accounts for a construction management SaaS application and/or enabling data records to be mirrored across connected accounts. The one or more computing systems of back-end platform 102 may take various forms and be arranged in various manners.

For instance, as one possibility, back-end platform 102 may comprise computing infrastructure of a public, private, and/or hybrid cloud (e.g., computing and/or storage clusters) that has been provisioned with software for carrying out one or more of the platform functions disclosed herein. In this respect, the entity that owns and operates back-end platform 102 may either supply its own cloud infrastructure or may obtain the cloud infrastructure from a third-party provider of "on demand" computing resources, such include Amazon Web Services (AWS) or the like. As another possibility, back-end platform 102 may comprise one or more dedicated servers that have been provisioned with software for carrying out one or more of the platform functions disclosed herein. Other implementations of back-end platform 102 are possible as well.

In turn, client stations 112, 114, 116 may take any of various forms, examples of which may include a desktop computer, a laptop, a netbook, a tablet, a smartphone, and/or a personal digital assistant (PDA), among other possibilities.

As further depicted in FIG. 1, back-end platform 102 is configured to interact with one or more client stations 112, 114, 116 over respective communication paths. Each communication path between back-end platform 102 and one of client stations 112, 114, 116 may generally comprise one or more communication networks and/or communications links, which may take any of various forms. For instance, each respective communication path with back-end platform 102 may include any one or more of point-to-point links, Personal Area Networks (PANs), Local-Area Networks (LANs), Wide-Area Networks (WANs) such as the Internet or cellular networks, cloud networks, and/or operational technology (OT) networks, among other possibilities. Further, the communication networks and/or links that make up each respective communication path with back-end platform 102 may be wireless, wired, or some combination thereof, and may carry data according to any of various different communication protocols. Although not shown, the respective communication paths with back-end platform 102 may also include one or more intermediate systems. For example, it is possible that back-end platform 102 may communicate with a given client station 112, 114, 116 via one or more intermediary systems, such as a host server (not shown). Many other configurations are also possible.

Although not shown in FIG. 1, back-end platform 102 may also be configured to receive data from one or more external data sources that may be used to facilitate functions related to the disclosed process. A given external data source—and the data output by such data sources—may take various forms.

It should be understood that network configuration 100 is one example of a network configuration in which embodiments described herein may be implemented. Numerous other arrangements are possible and contemplated herein. For instance, other network configurations may include additional components not pictured and/or more or less of the pictured components.

II. EXAMPLE PLATFORM

Figure 2:
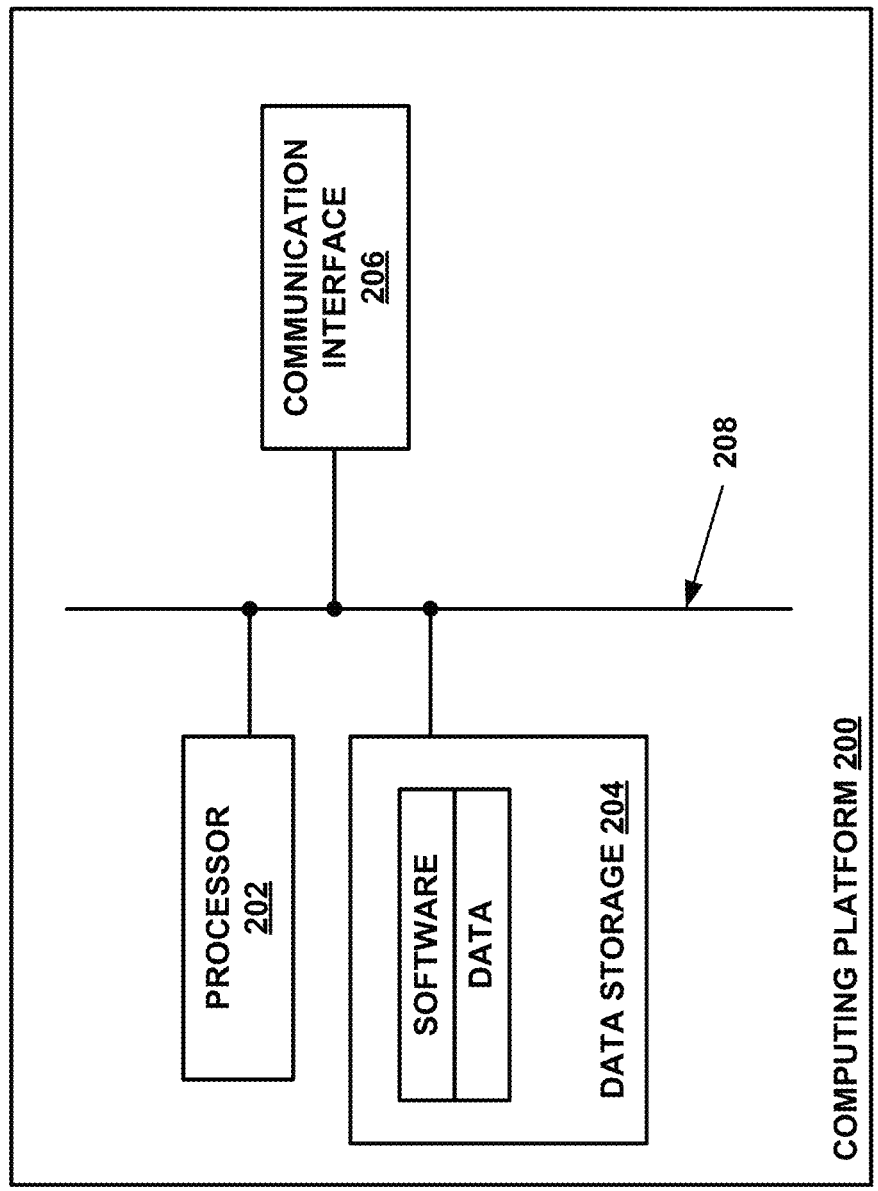
FIG. 2 depicts an example computing platform that may be configured to carry out one or more of the functions of the present disclosure.

FIG. 2 is a simplified block diagram illustrating some structural components that may be included in an example computing platform 200, which could serve as back-end platform 102 of FIG. 1. In line with the discussion above, platform 200 may generally comprise one or more computer systems (e.g., one or more servers), and these one or more computer systems may collectively include at least a processor 202, data storage 204, and a communication interface 206, all of which may be communicatively linked by a communication link 208 that may take the form of a system bus, a communication network such as a public, private, or hybrid cloud, or some other connection mechanism.

Processor 202 may comprise one or more processor components, such as general-purpose processors (e.g., a single- or multi-core microprocessor), special-purpose processors (e.g., an application-specific integrated circuit or digital-signal processor), programmable logic devices (e.g., a field programmable gate array), controllers (e.g., microcontrollers), and/or any other processor components now known or later developed. In line with the discussion above, it should also be understood that processor 202 could comprise processing components that are distributed across a plurality of physical computing devices connected via a network, such as a computing cluster of a public, private, or hybrid cloud.

In turn, data storage 204 may comprise one or more non-transitory computer-readable storage mediums, examples of which may include volatile storage mediums such as random-access memory, registers, cache, etc. and non-volatile storage mediums such as read-only memory, a hard-disk drive, a solid-state drive, flash memory, an optical-storage device, etc. In line with the discussion above, it should also be understood that data storage 204 may comprise computer-readable storage mediums that are distributed across a plurality of physical computing devices connected via a network, such as a storage cluster of a public, private, or hybrid cloud.

As shown in FIG. 2, data storage 204 may be provisioned with software components that enable the platform 200 to carry out the platform-side functions disclosed herein. These software components may generally take the form of program instructions that are executable by the processor 202 to carry out the disclosed functions, which may be arranged together into software applications, virtual machines, software development kits, toolsets, or the like. Further, data storage 204 may be arranged to store data in one or more databases, file systems, or the like. Data storage 204 may take other forms and/or store data in other manners as well.

Communication interface 206 may be configured to facilitate wireless and/or wired communication with external data sources and/or client stations, such as client stations 112, 114, 116 in FIG. 1. Additionally, in an implementation where platform 200 comprises a plurality of physical computing devices connected via a network, communication interface 206 may be configured to facilitate wireless and/or wired communication between these physical computing devices (e.g., between computing and storage clusters in a cloud network). As such, communication interface 206 may take any suitable form for carrying out these functions, examples of which may include an Ethernet interface, a serial bus interface (e.g., Firewire, USB 3.0, etc.), a chipset and antenna adapted to facilitate wireless communication, and/or any other interface that provides for wireless and/or wired communication. Communication interface 206 may also include multiple communication interfaces of different types. Other configurations are possible as well.

Although not shown, platform 200 may additionally include one or more interfaces that provide connectivity with external user-interface equipment (sometimes referred to as "peripherals"), such as a keyboard, a mouse or trackpad, a display screen, a touch-sensitive interface, a stylus, a virtual-reality headset, speakers, etc., which may allow for direct user interaction with platform 200.

It should be understood that platform 200 is one example of a computing platform that may be used with the embodiments described herein. Numerous other arrangements are possible and contemplated herein. For instance, other computing platforms may include additional components not pictured and/or more or less of the pictured components.

III. PREQUALIFICATION SOFTWARE TOOL

As discussed above, software technology disclosed herein includes a prequalification software tool that improves upon existing software tools for facilitating a prequalification process related to construction projects. This disclosed prequalification software tool may include various aspects, which are described in further detail below. For purposes of illustration, the disclosed prequalification software tool is described below in the context of a GC engaging in a prequalification process for subcontractors, but it should be understood that the disclosed software technology may be used in connection with other types of prequalification processes as well (e.g., prequalification of GCs by an owner or architect). In this respect, the party that initiates the prequalification process in order to prequalify others to work on construction projects may generally be referred to as the "initiator" and the parties that are submitting information and being evaluated as part of the prequalification process may generally be referred to as "submitters."

A. Creating a Prequalification Form

For instance, in one aspect, the disclosed prequalification software tool may provide an interface through which a user associated with the GC can create prequalification forms for obtaining prequalification information from subcontractors, where each prequalification form can be tailored for a particular type of construction project, a particular aspect of a construction project being put out to bid (e.g., concrete, carpentry, etc.), or the like. For instance, the interface may allow for a user associated with the GC to create one type of form designed to obtain information from subcontractors that may intend to bid for work with respect to, say, the plumbing and ductwork aspects of a construction project, and another type of form designed to obtain information from subcontractors that may intend to bid for work with respect to, say, electrical system aspects of the construction project. In some implementations, the interface may allow a user associated with the GC to store created forms in local or cloud storage locations so that they can be recalled and provided to submitters for subsequent construction projects. The interface may allow users to engage in other functionality as well.

More particularly, but still by way of example, to facilitate the creation of a prequalification form, the software tool may, though the interface, provide a user with a set of predefined fields to include in the prequalification form. The interface may allow a user to provide certain user inputs in order to select from a list of predefined fields to include in the prequalification form. For instance, the interface may allow a user to click (or provide some other kind of user input, such as a tap) on the predefined fields the user desires to include in the form. The interface may also provide an option to designate certain fields as "required." In addition to providing certain predefined fields, the interface may additionally or alternatively provide a user with an option to create new fields. The interface may also allow a user to provide certain user inputs in order to create one or more custom fields to include in the prequalification form. For instance, the interface may provide a blank field, within which a user may input text in order to create a custom field to include in the form. Other ways to provide the ability to create custom fields are possible as well.

Figure 3A:
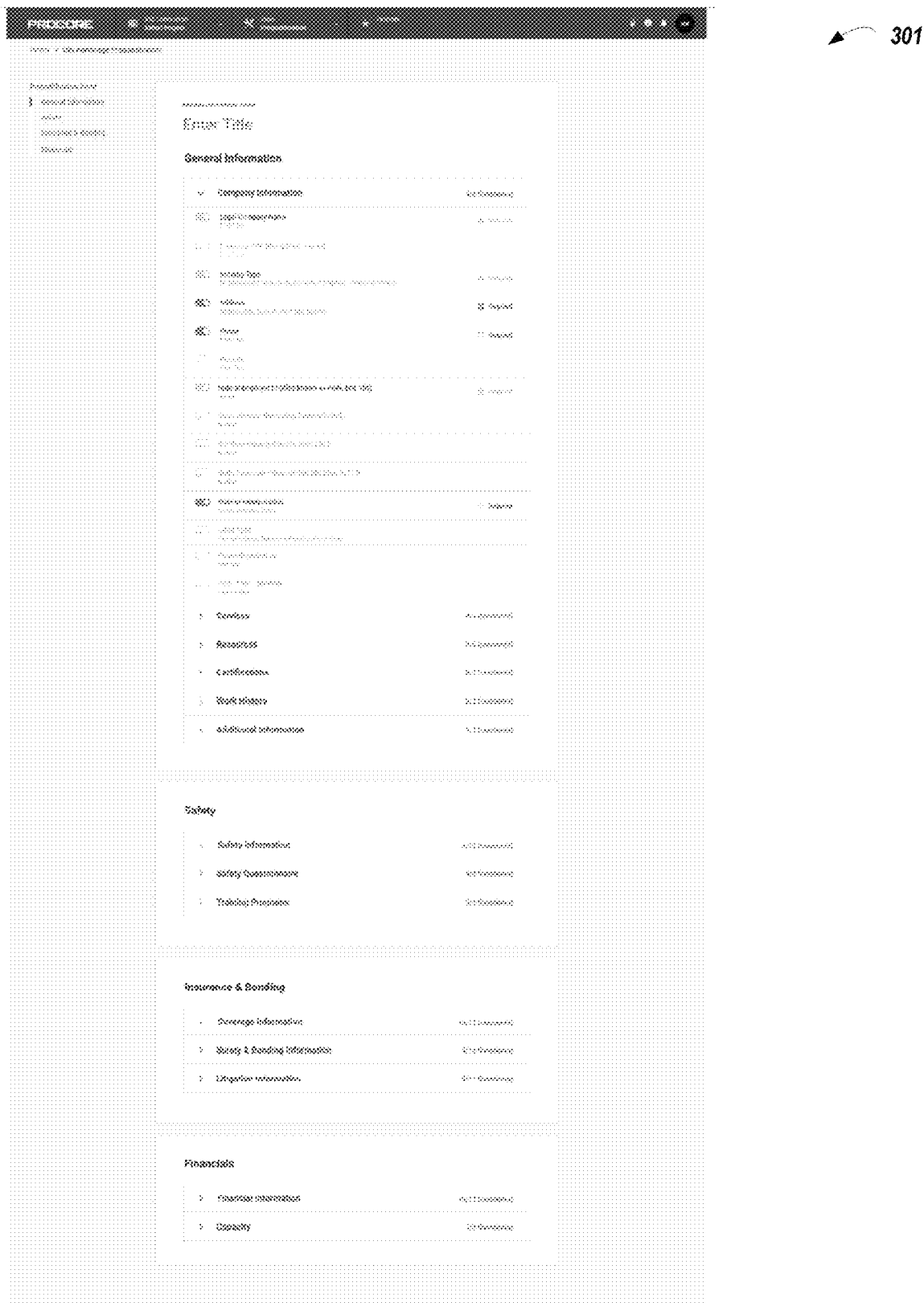
FIG. 3A depicts an example snapshot of an interface that may be presented to a user in accordance with one embodiment.
Figure 3B:
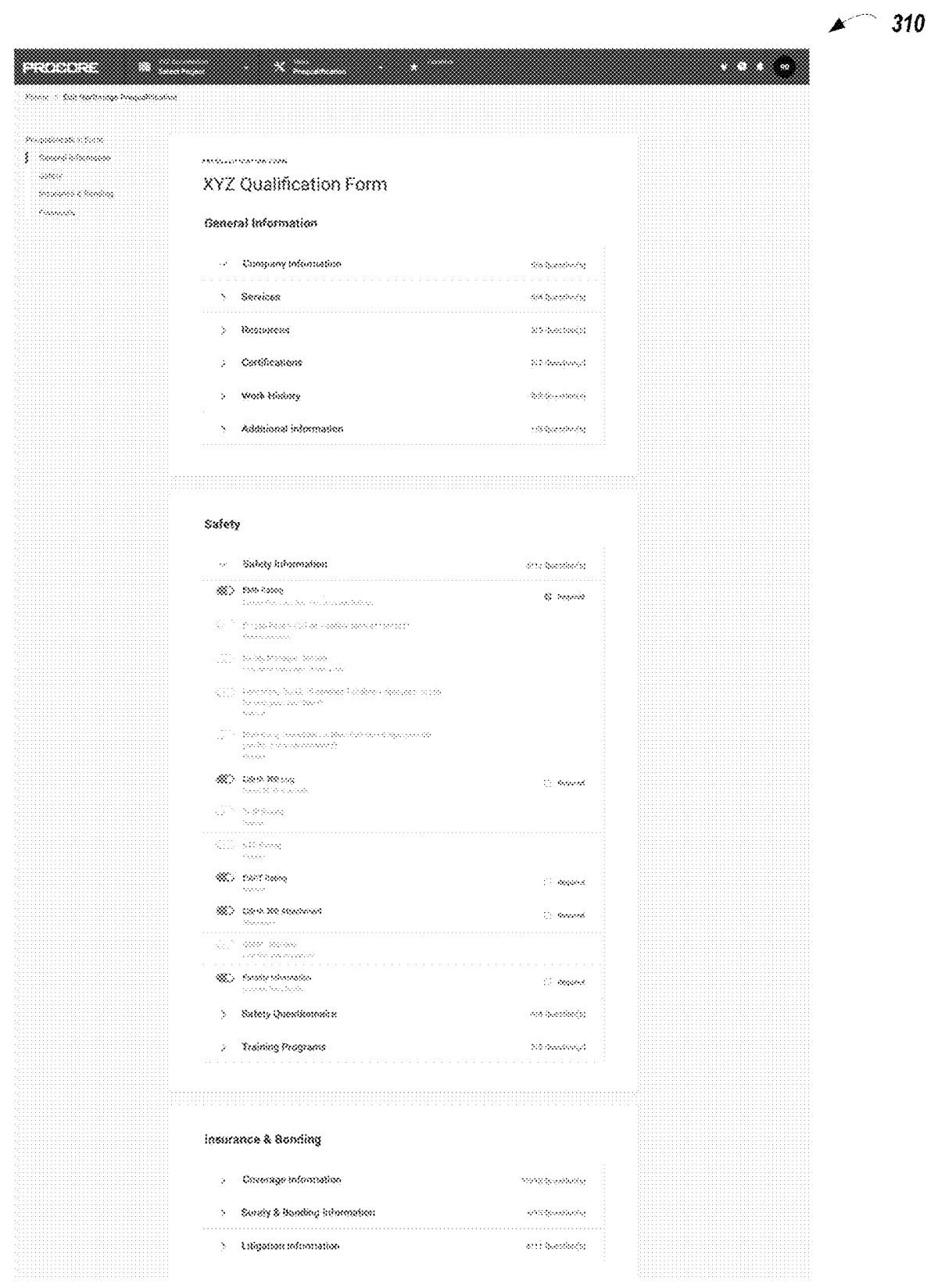
Figure 3C:
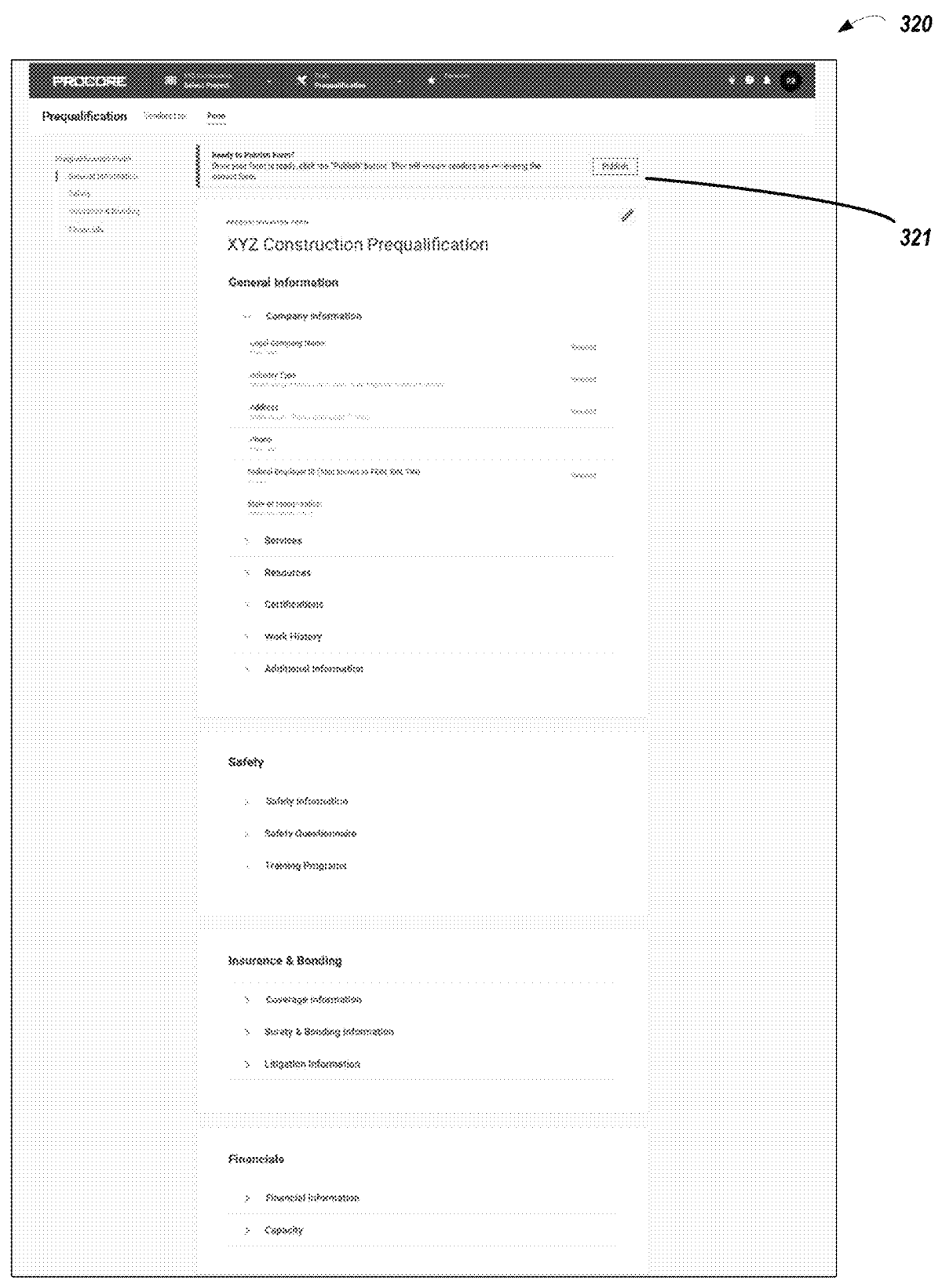

To help illustrate some of the foregoing functionality, FIG. 3A-C depict various snapshots of an example interface that may be provided by the disclosed software tool in order to facilitate creation of a prequalification form. Turning first to FIG. 3A, snapshot 301 depicts an interface that presents various predefined fields that a user may select to include in a prequalification form. As depicted, the interface includes an area for entering a title of the prequalification form, and an area for selecting from among several predefined fields. The predefined fields may be broken out into categories, which as depicted in the example interface depicted in FIG. 3A include "General Information," "Safety," "Insurance & Bonding," and "Financials," although in other examples, other categories are possible. As further depicted, the predefined fields may be broken out further into subcategories. For instance, as depicted, under the category "General Information" there are several subcategories of fields, including "Company Information," "Services," "Resources," "Certifications," "Work History," and "Additional Information," although other examples are possible. When a certain subcategory is clicked, the interface may operate to display the fields contained within that subcategory and may operate to hide or "roll-up" the fields under the other subcategories. As depicted, for example, the fields contained within subcategory "Company Information" are displayed, whereas the fields contained within the other subcategories are not displayed.

As mentioned, the software tool may be configured to receive through the interface user inputs which may instruct the software to include a field in the prequalification form. For example, when a user clicks or taps on a given field, the computing software tool may treat this as an instruction to include that field in the prequalification form being created. The software tool may responsively cause the interface to display an indication that the given field has been selected, such as moving a radio button slider from the left position to the right position and/or changing the color of the radio button slider, among other possible examples. In some embodiments, some fields may be automatically selected and included in the prequalification form by default, such as "Legal Company Name" and "Industry Type." Depending on the implementation, the software tool may not permit these automatically-selected fields to be unselected. As also indicated, the interface may provide the ability for a user to designate a field as "required" such as providing a check box, which when checked by a user, may operate as an instruction to the software tool to indicate in the prequalification form that the given field is a required one. If a certain field is designated "required" then the software tool may cause the prequalification form to be presented to a submitter with an indication that the given field is "required." The software tool may not permit the submitter to submit the form unless and until every field designated "required" has a response. Similarly, if a certain field is not designated "required" then the software tool may cause the prequalification form to be presented to a submitter with an indication that the given field is not "required." The software tool may permit the submitter to submit the form with or without responses in fields not designated "required." In other embodiments, other designations may be possible.

Turning next to FIG. 3B, snapshot 310 depicts an interface that presents additional predefined fields that a user may select to include in a prequalification form. In FIG. 3B, this interface depicts various example predefined fields that may be contained within the "Safety Information" subcategory, although in other examples, other predefined fields are possible. Additionally, the interface depicts an example title of the prequalification form ("XYZ Qualification Form") that may have been entered by a user.

Turning next to FIG. 3C, snapshot 320 depicts an interface that presents a prompt 321 to "publish" the draft prequalification form. The software tool may present such a prompt once a user has clicked through all the various categories and subcategories of predefined fields and has selected the desired fields. As depicted, the prompt includes a "publish" button, which when clicked may instruct the software tool to save the draft prequalification form.

B. Inviting Submitters to Participate in Prequalification Process

In another aspect, after a user associated with a GC has created a prequalification form via the disclosed prequalification software tool, the disclosed prequalification software tool may invite a given set of one or more subcontractors to participate in the GC's prequalification process by filling out the GC's prequalification form. In this respect, the given set of one or more subcontractors that are invited to fill out the GC's prequalification form may be specified by a user associated with the GC and/or may be selected by the prequalification software tool based on certain criteria associated with the GC's prequalification form, among other possibilities.

For instance, in one implementation, the disclosed prequalification software tool may provide an interface through which a user associated with a GC may specify which subcontractors are to be invited to participate in the GC's prequalification process. Such an interface may take various forms.

As one possibility, the interface for specifying which subcontractors are to be invited to participate in the GC's prequalification process may comprise a list of subcontractors that have previously been associated with the GC (e.g., subcontractors included in the GC's company directory) along with a selectable option for inviting each such subcontractor to participate in the GC's prequalification process. One example of such an interface is depicted in FIGS. 4A-D. In particular, snapshot 401 depicts an interface that presents an example list of subcontractors along with various contact information for each subcontractor and selectable options for inviting each subcontractor to participate in the GC's prequalification process. For instance, as depicted, along with the name of each subcontractor, the interface may also present the subcontractor's email, phone number, fax number, address, and company name, along with other possible information. And as also depicted, the selectable option for inviting a given subcontractor to participate in the GC's prequalification process may, among other possibilities, take the form of a "Prequalifiy" button, which when selected by a user may cause the software tool to issue an invitation to the given subcontractor to participate in the prequalification process.

Figure 4A:
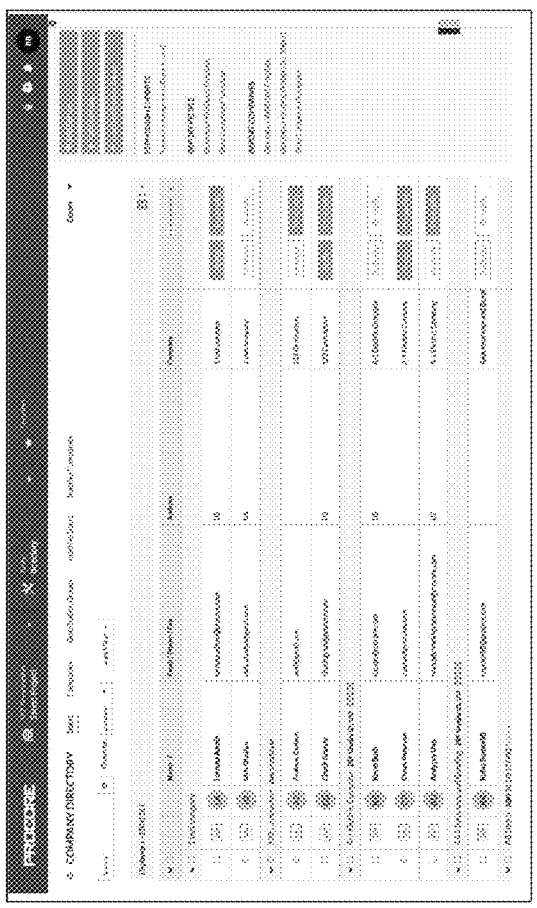
FIG. 4A depicts an example snapshot of an interface that may be presented to a user in accordance with one embodiment.
Figure 4B:
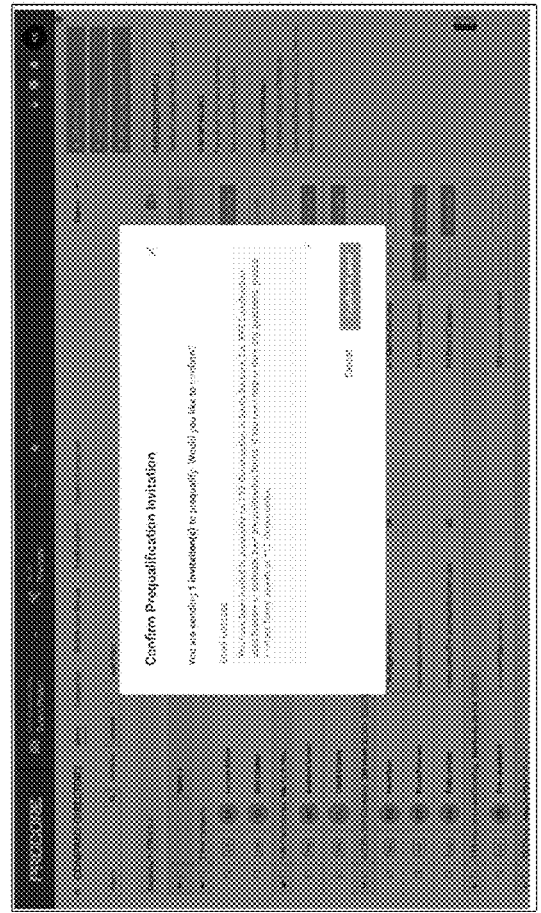
FIG. 4B depicts an example snapshot of an interface that may be presented to a user in accordance with one embodiment.
Figure 4C:
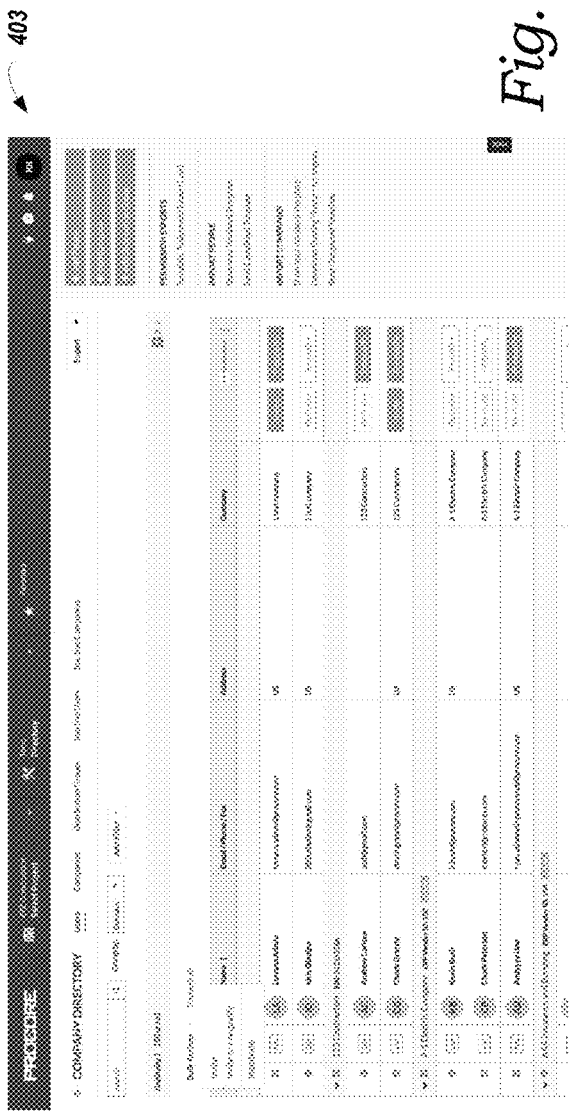
FIG. 4C depicts an example snapshot of an interface that may be presented to a user in accordance with one embodiment.

In some implementations, prior to issuing invitation, but in response to receiving a user input selecting a given "Prequalification" button or the like, the software tool may present a prompt to confirm the user's intent to send an invitation to the given subcontractor. Snapshot 402 in FIG. 4B depicts one such example prompt. The example prompt may provide an indication of how many invitations will be sent and a field within which a user may enter a short message to include with the invitation to the subcontractor. The prompt may also include a "Confirm & Send" button, which when selected by a user may cause the software tool to issue the invitation. Other examples of prompts may be possible as well.

In addition to enabling a user associated with a GC to issue a prequalification invitation to an individual user associated with a subcontractor, the example interface illustrated above may also enable a user associated with a GC to issue prequalification invitations to multiple different users associated with the multiple different subcontractors in a bulk fashion. For instance, as depicted in snapshot 403 in FIG. 4C, the interface may include a selection mechanism, such as a respective checkbox associated with each subcontractor or the like, that enables a user to select one or more subcontractors from the list of subcontractors. The interface may further provide various commands from a dropdown menu, one of which may include an "Invite to Prequalify" command, which when selected by the user, may cause the software tool to issue an invitation to each selected subcontractor to participate in the prequalification process.

Figure 4D:
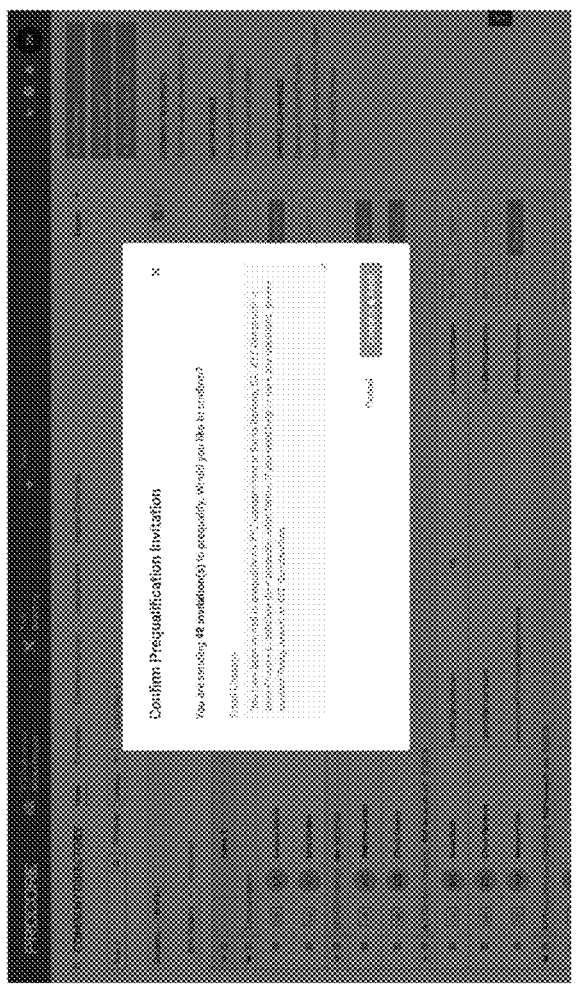
FIG. 4D depicts an example snapshot of an interface that may be presented to a user in accordance with one embodiment.

In some implementations, prior to issuing multiple invitations, but in response to receiving a user input selecting an "Invite to Prequalify" command or the like, the software tool may present a prompt to confirm the user's intent to send multiple invitations to the selected subcontractors. Snapshot 404 in FIG. 4D depicts one such example prompt. The example prompt may provide an indication of how many invitations will be sent and a field within which a user may enter a short message to include with the invitation to the subcontractors. The prompt may also include a "Confirm & Send" button, which when selected by a user may cause the software tool to issue the invitation. Other examples of prompts may be possible as well.

As another possibility, the interface for specifying which subcontractors are to be invited to participate in the GC's prequalification process may comprise a list of subcontractors that have previously expressed interest in becoming prequalified for construction projects along with a selectable option for inviting each such subcontractor to participate in the GC's prequalification process. Such an interface may include various information about the subcontractors that have expressed interest in becoming prequalified, including but not limited to general information about the subcontractor (e.g., name, location, area of expertise, etc.) and perhaps also information about the types of construction projects for which the subcontractor is interested in becoming prequalified (e.g., project location, project scope, project duration, project cost, etc.), among other possibilities. After a user associated with a GC inputs a selection of one or more subcontractors include in the list of subcontractors presented via this interface, the disclosed prequalification software tool may then issue a respective invitation to each selected subcontractor to fill out one of the GC's prequalification forms.

The interface for specifying which subcontractors are to be invited to participate in the GC's prequalification process may take various other forms as well.

In another implementation, the disclosed prequalification software tool may be configured to automatically select the subcontractors that are invited to fill out the GC's prequalification form based on certain criteria associated with that prequalification form, which may be defined based on input from the GC. For example, during the process of creating a new prequalification form for the GC, the disclosed prequalification software tool may also receive input from a user associated with the GC that may be used to define criteria for selecting the particular subcontractors that are to be invited to fill out the prequalification form.

The function of inviting subcontractors to fill out the GC's prequalification form may take various other forms as well.

Figure 5A:
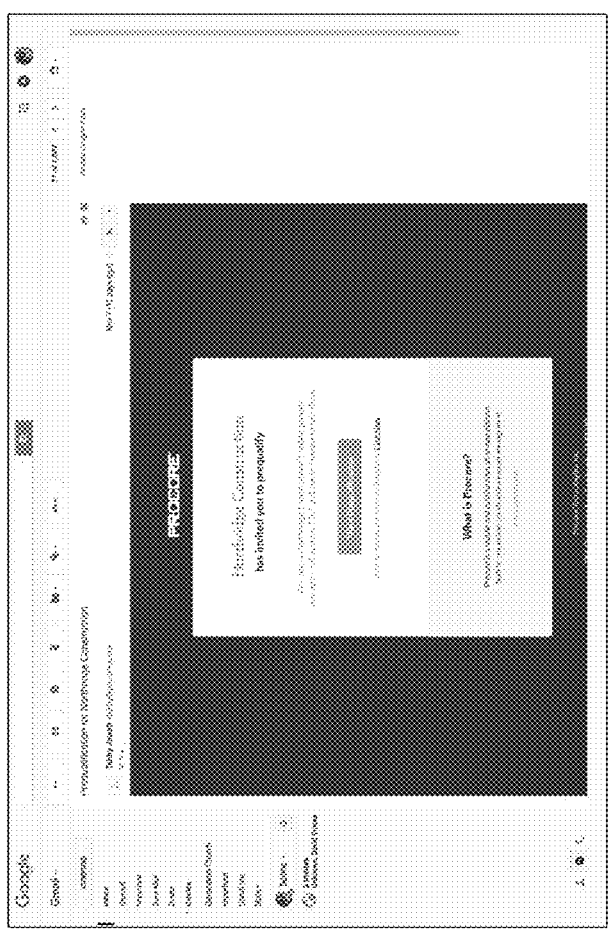
FIG. 5A depicts an example snapshot of an interface that may be presented to a user in accordance with one embodiment.
Figure 5B:
FIG. 5B depicts an example snapshot of an interface that may be presented to a user in accordance with one embodiment.

Further, the invitation that is issued by the disclosed prequalification software tool to a subcontractor may take various forms. As one possibility, an invitation to a subcontractor may take the form of an email that is sent to a user associated with the subcontractor and includes a link for accessing the prequalification software tool. Snapshot 501 in FIG. 5A depicts an example email invitation that may be sent (or caused to be sent) by the software tool in response to receiving a user input selecting an "Invite to Prequalify" button, as described above, or the like. As depicted, the example invite may include a "View Prequalification" button, which when selected by a user, may cause a computing system to navigate to a webpage to access the prequalification software tool. Snapshot 502 in FIG. 5B, for instance, depicts an example login screen that may be displayed at a webpage navigated to by a user's computing device when that user selects the "View Prequalification" button presented in the invitation. The login screen may allow a user to enter credentials, which when authenticated by the disclosed software tool, may cause the software tool to present the prequalification form to the user. Other examples of invitations and login screens are possible as well.

C. Filling Out a Prequalification Form

In yet another aspect, after a subcontractor receives an invitation to fill out a GC's prequalification form, the disclosed prequalification software tool may provide an interface through which a user associated with the subcontractor can populate the GC's prequalification form with the subcontractor's prequalification information and then submit that completed version of the prequalification form back to the GC, which may serve as the subcontractor's submission to be prequalified by the GC.

To facilitate this, the software tool may first present a landing page that presents indications of the prequalification forms that the subcontractor has been invited to fill out. For instance, the landing page may present a list of all prequalification forms that the subcontractor has been invited to fill out. For each prequalification form indicated on the landing page, the interface may also display information indicating who sent the invitation, the status of the form (e.g., new, in progress, complete, submitted, etc.), the qualification status (e.g., not assigned, qualified, rejected, etc.), the last modified date of the form, the last submitted date of the form, and an expiration date of the form, if applicable, among other possible examples. Snapshot 601 in FIG. 6A depicts one example of a landing page, which includes indications of various example prequalification forms, although other examples of landing pages are possible as well.

The software tool may provide the ability to, through the interface, select an indication of a prequalification form. When the software tool receives a user input (e.g., a click or tap) selecting a given prequalification form, the software tool may cause the interface to display one or more interface screens that may (i) present to the user various indications that communicate the extent to which certain sections or subsections of the form have been completed, (ii) present to the user selectable options for proceeding to screens that facilitate the collection of information from the user to complete the form. In addition, the interface may provide the ability to upload various documents, such as insurance certificates or the like, as part of completing the form. The software tool may additionally pre-populate certain information into a form for a subcontractor. For example, a given subcontractor may have a pre-existing account with the provider of the prequalification software tool. Through this account, the given subcontractor may have previously provided certain information (e.g., the name of the subcontractor, employer identification number, certain insurance information, etc.) to the provider of the prequalification software tool, which the provider may store and pre-populate into prequalification forms as invitations to complete such forms are received from time to time.

Figures 6A, 6B:
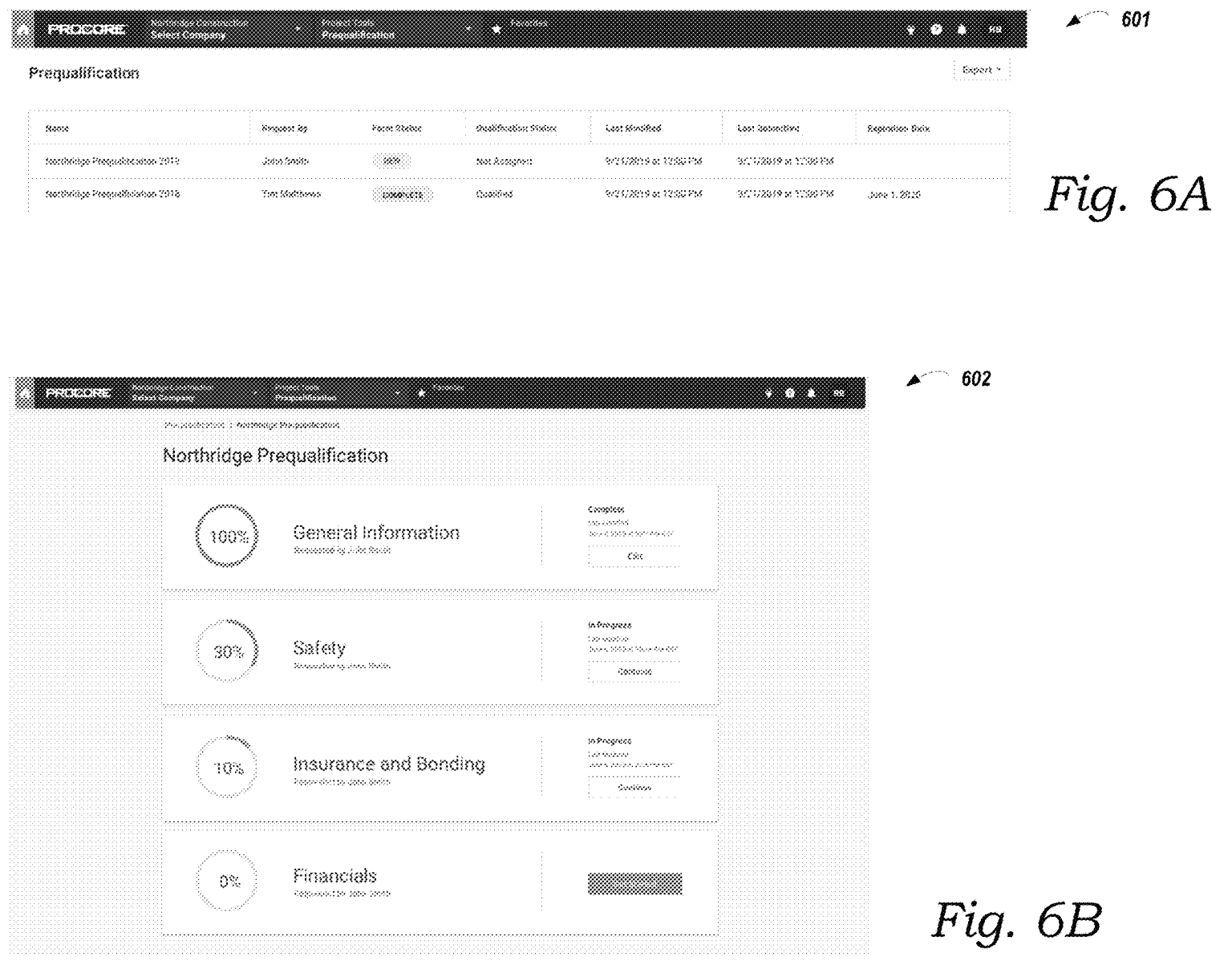

To help illustrate some of this functionality, snapshot 602 in FIG. 6B depicts an example prequalification screen that displays example graphical indications of the extent to which the "General Information," the "Safety," the "Insurance and Bonding," and the "Financials" sections of the "Northridge Prequalification" form have been completed. As depicted, 100% of the "general Information" section of the prequalification form has been completed, 30% of the "Safety" section of the prequalification form has been completed, 10% of the "Insurance and Bonding" section of the prequalification form has been completed, and 0% of the "Financials" section of the prequalification form has been completed.

Moreover, as depicted in snapshot 602, the interface may provide selectable options to provide information to complete the prequalification form or to edit information that has already been provided. For example, for each section (e.g., "General Information," "Safety," "Insurance and Bonding," and "Financials," among other possible sections) the interface may provide a selectable option to navigate to one or more additional screens that facilitate receiving information. Depending on the extent to which a given section has been completed, the selectable option may take the form of a "Get Started" button (e.g., if the section has not been started or has 0% completion), a "Continue" button (e.g., if the section has been started or has between a 0% and a 100% completion), and an "Edit" button (e.g., if the section has been completed or has a 100% completion). Other examples of selectable options are possible as well.

Figures 7A, 7B:
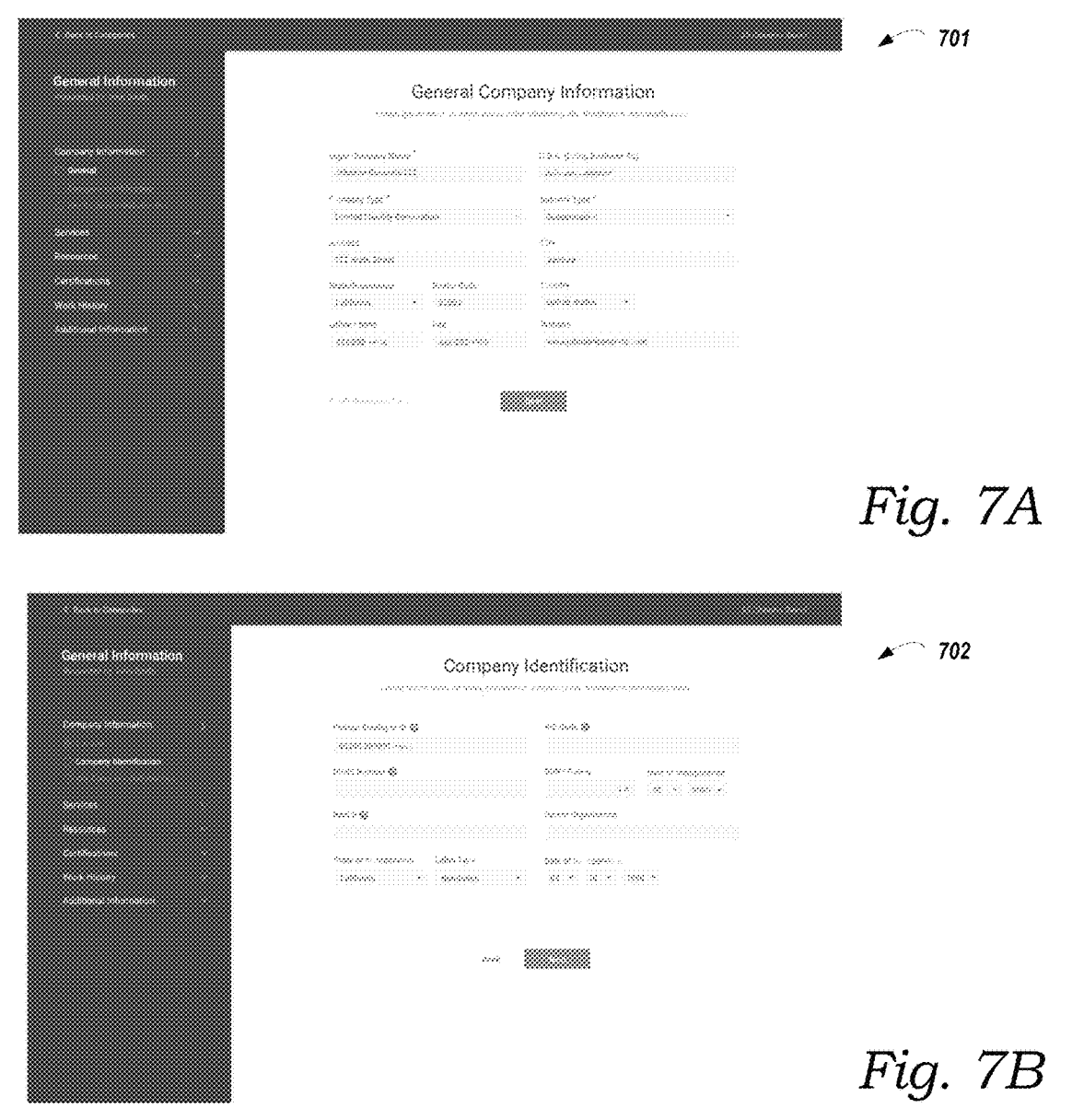

To illustrate various examples of screens that may be provided by the software tool to facilitate the collection of information for the prequalification form, additional example snapshots are depicted in FIGS. 7A-O, 8A-J, 9A-L and 10A-E. FIGS. 7A-O depict example screens that may be presented by the interface to facilitate the collection of information associated with the "General Information" category, FIGS. 8A-J depict example screens that may be presented by the interface to facilitate the collection of information associated with the "Safety" category, FIGS. 9A-L depict example screens that may be presented by the interface to facilitate the collection of information associated with the "Insurance and Bonding" category, and FIGS. 10A-E depict example screens that may be presented by the interface to facilitate the collection of information associated with the "Financials" category.

Snapshot 701 in FIG. 7A, for instance, depicts an example screen that may be presented by the interface to allow a user associated with the subcontractor to provide to the software tool General Company Information.

Snapshot 702 in FIG. 7B, for instance, depicts an example screen that may be presented by the interface to allow a user associated with the subcontractor to provide to the software tool Company Identification information.

Figures 7C, 7D:
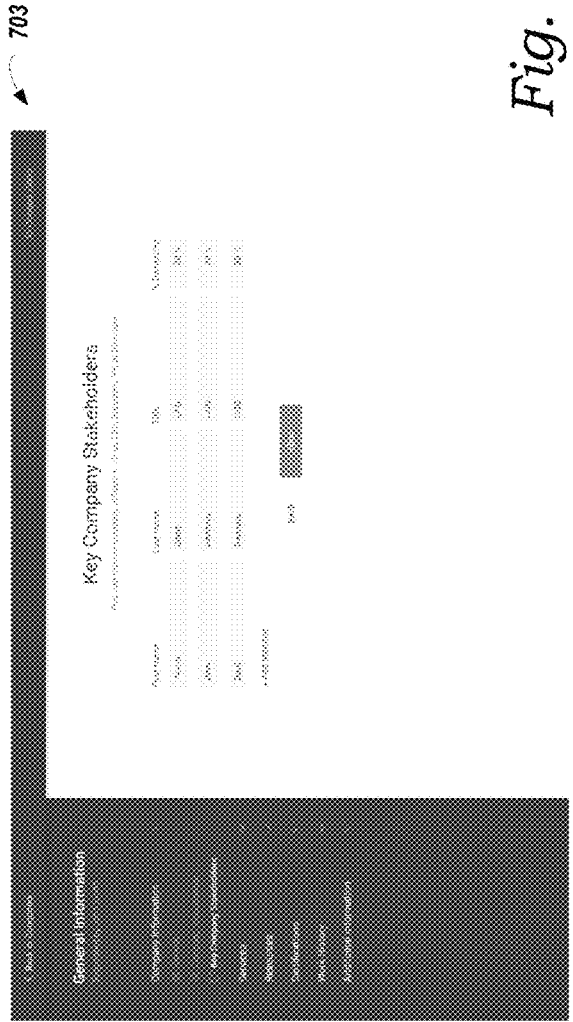
FIG. 7C depicts an example snapshot of an interface that may be presented to a user in accordance with one embodiment.
FIG. 7D depicts an example snapshot of an interface that may be presented to a user in accordance with one embodiment.

Snapshot 703 in FIG. 7C, for instance, depicts an example screen that may be presented by the interface to allow a user associated with the subcontractor to provide to the software tool Key Company Stakeholder information.

Snapshot 704 in FIG. 7D, for instance, depicts an example screen that may be presented by the interface to allow a user associated with the subcontractor to provide to the software tool Market Segment information.

Snapshot 705 in FIG. 7E, for instance, depicts an example screen that may be presented by the interface to allow a user associated with the subcontractor to provide to the software tool States Served information.

Snapshot 706 in FIG. 7F, for instance, depicts an example screen that may be presented by the interface to allow a user associated with the subcontractor to provide to the software tool Scopes of Work information.

Figure 7G:
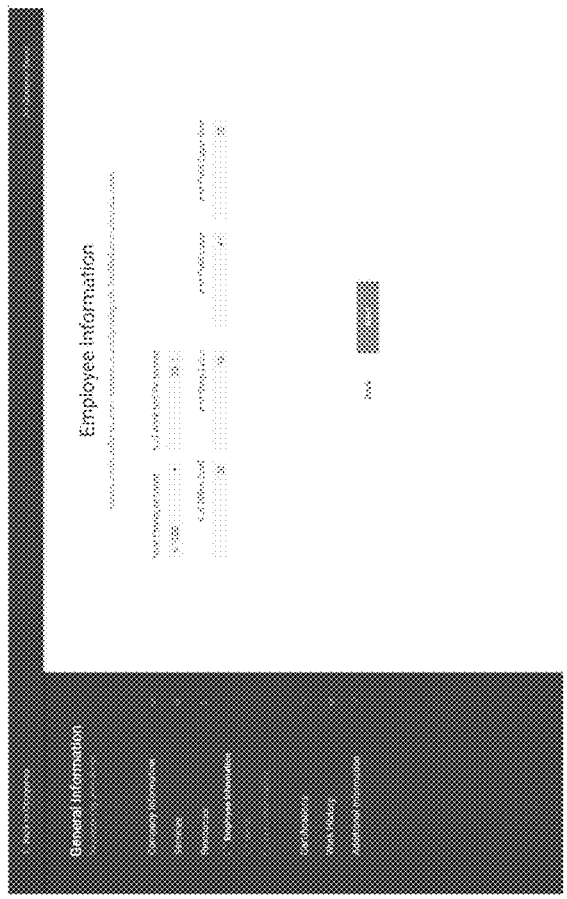
FIG. 7G depicts an example snapshot of an interface that may be presented to a user in accordance with one embodiment.

Snapshot 707 in FIG. 7G, for instance, depicts an example screen that may be presented by the interface to allow a user associated with the subcontractor to provide to the software tool Employee Information.

Figure 7H:
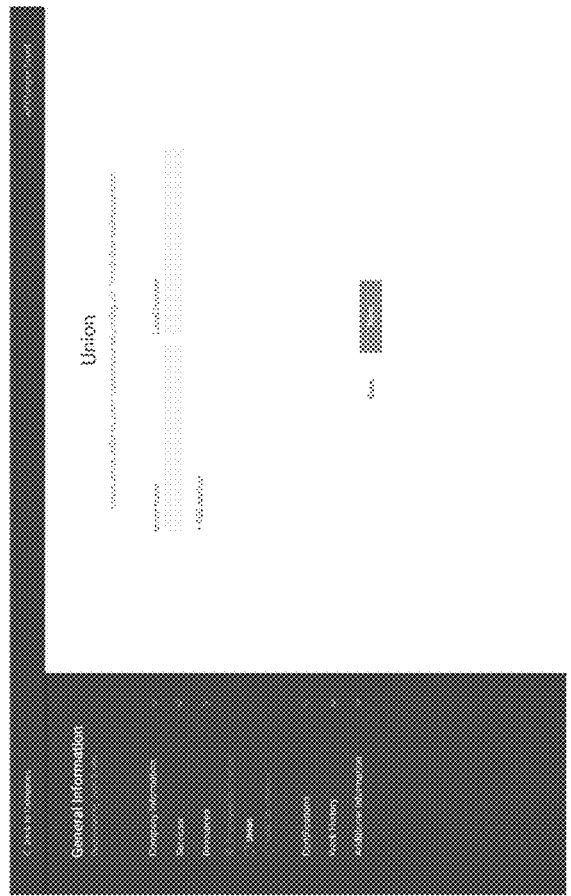
FIG. 7H depicts an example snapshot of an interface that may be presented to a user in accordance with one embodiment.

Snapshot 708 in FIG. 7H, for instance, depicts an example screen that may be presented by the interface to allow a user associated with the subcontractor to provide to the software tool Union information.

Figure 7I:
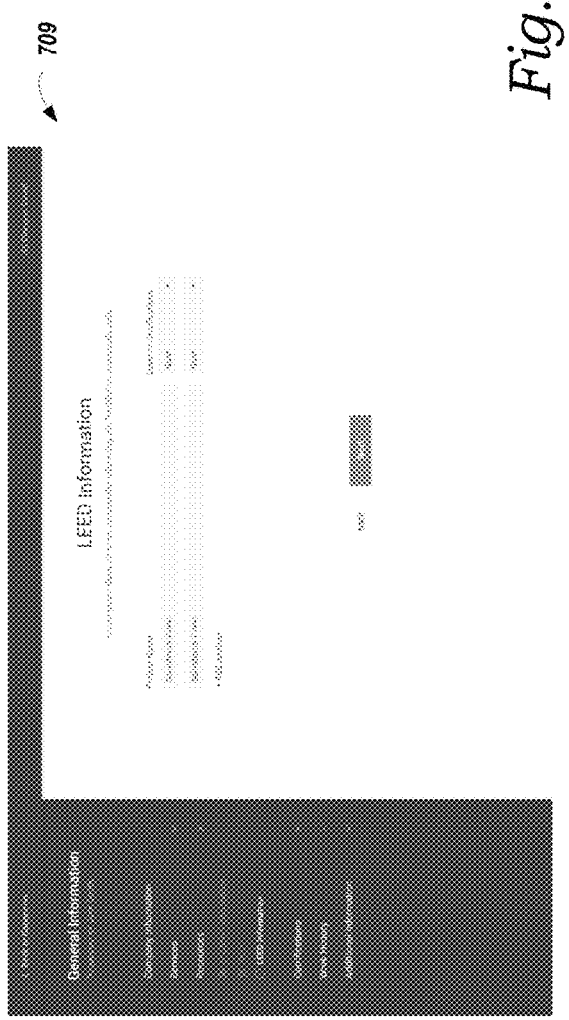
FIG. 7I depicts an example snapshot of an interface that may be presented to a user in accordance with one embodiment.

Snapshot 709 in FIG. 7I, for instance, depicts an example screen that may be presented by the interface to allow a user associated with the subcontractor to provide to the software tool LEED Information.

Figure 7J:
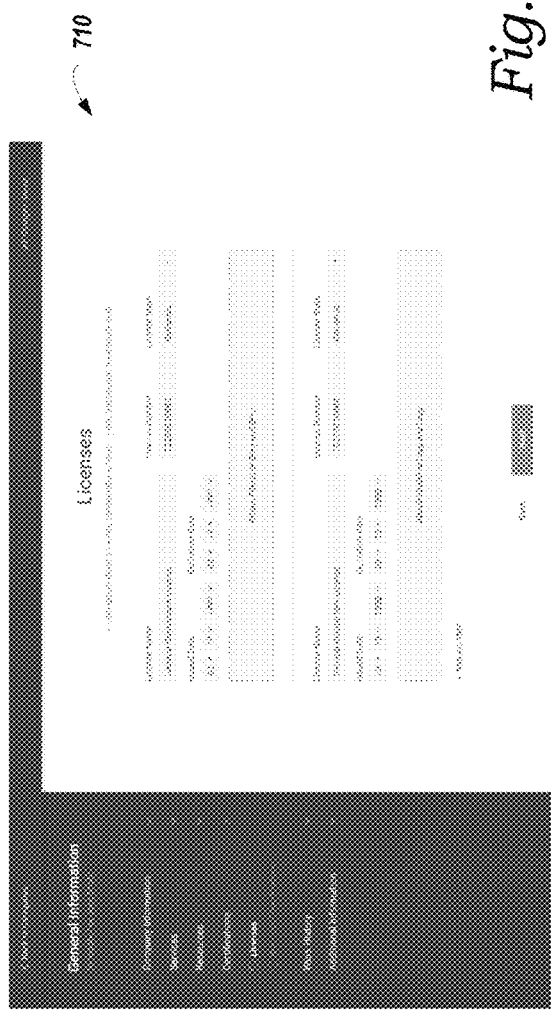
FIG. 7J depicts an example snapshot of an interface that may be presented to a user in accordance with one embodiment.

Snapshot 710 in FIG. 7J, for instance, depicts an example screen that may be presented by the interface to allow a user associated with the subcontractor to provide to the software tool Licenses information.

Figure 7K:
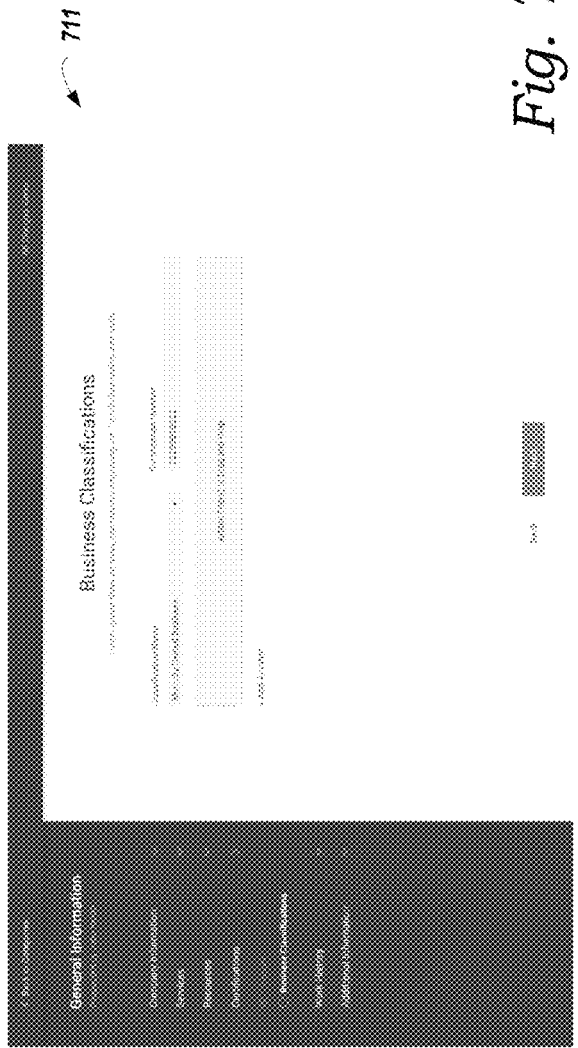
FIG. 7K depicts an example snapshot of an interface that may be presented to a user in accordance with one embodiment.

Snapshot 711 in FIG. 7K, for instance, depicts an example screen that may be presented by the interface to allow a user associated with the subcontractor to provide to the software tool Business Classifications information.

Figure 7L:
FIG. 7L depicts an example snapshot of an interface that may be presented to a user in accordance with one embodiment.

Snapshot 712 in FIG. 7L, for instance, depicts an example screen that may be presented by the interface to allow a user associated with the subcontractor to provide to the software tool Previous Project Information.

Figure 7M:
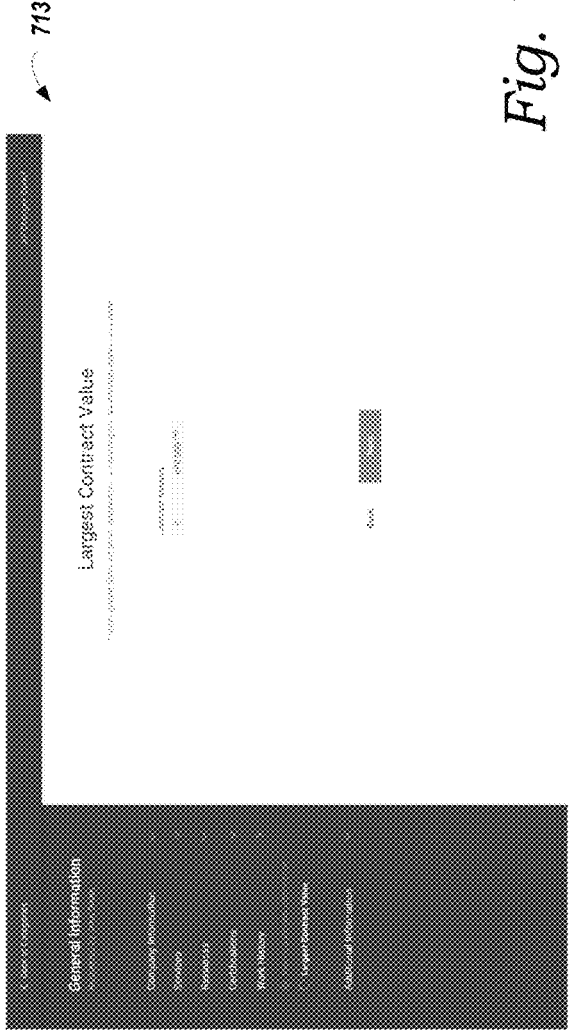
FIG. 7M depicts an example snapshot of an interface that may be presented to a user in accordance with one embodiment.

Snapshot 713 in FIG. 7M, for instance, depicts an example screen that may be presented by the interface to allow a user associated with the subcontractor to provide to the software tool Largest Contract Value information.

Figure 7N:
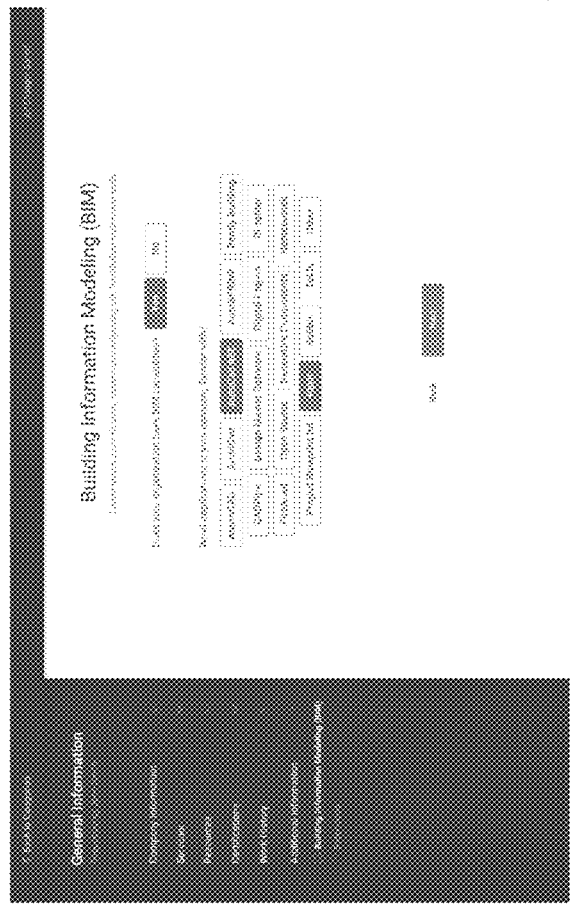
FIG. 7N depicts an example snapshot of an interface that may be presented to a user in accordance with one embodiment.
Figure 7O:
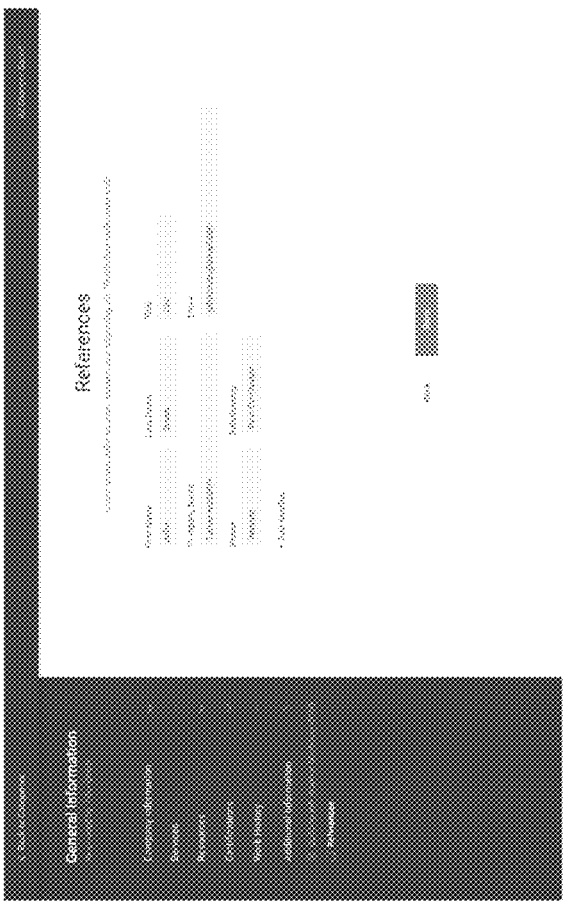
FIG. 7O depicts an example snapshot of an interface that may be presented to a user in accordance with one embodiment.

Snapshot 714 in FIG. 7N, for instance, depicts an example screen that may be presented by the interface to allow a user associated with the subcontractor to provide to the software tool Building Information Modeling (BIM) information.

Snapshot 715 in FIG. 7O, for instance, depicts an example screen that may be presented by the interface to allow a user associated with the subcontractor to provide to the software tool References information.

Figure 8A:
FIG. 8A depicts an example snapshot of an interface that may be presented to a user in accordance with one embodiment.

Snapshot 801 in FIG. 8A, for instance, depicts an example screen that may be presented by the interface to allow a user associated with the subcontractor to provide to the software tool EMR Rating information.

Figure 8B:
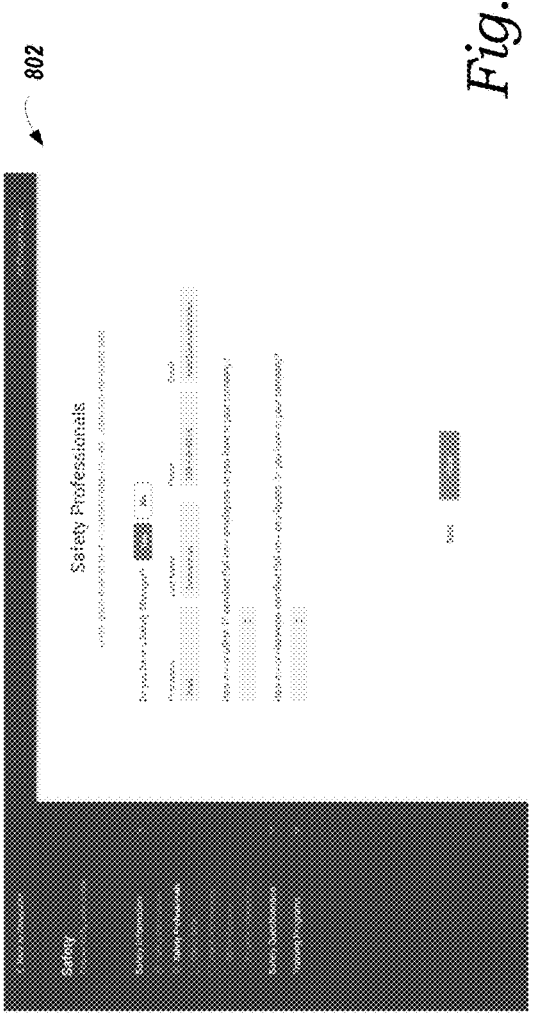
FIG. 8B depicts an example snapshot of an interface that may be presented to a user in accordance with one embodiment.

Snapshot 802 in FIG. 8B, for instance, depicts an example screen that may be presented by the interface to allow a user associated with the subcontractor to provide to the software tool Safety Professionals information.

Figure 8C:
FIG. 8C depicts an example snapshot of an interface that may be presented to a user in accordance with one embodiment.

Snapshot 803 in FIG. 8C, for instance, depicts an example screen that may be presented by the interface to allow a user associated with the subcontractor to provide to the software tool OSHA 300A information.

Figures 8D, 8E:
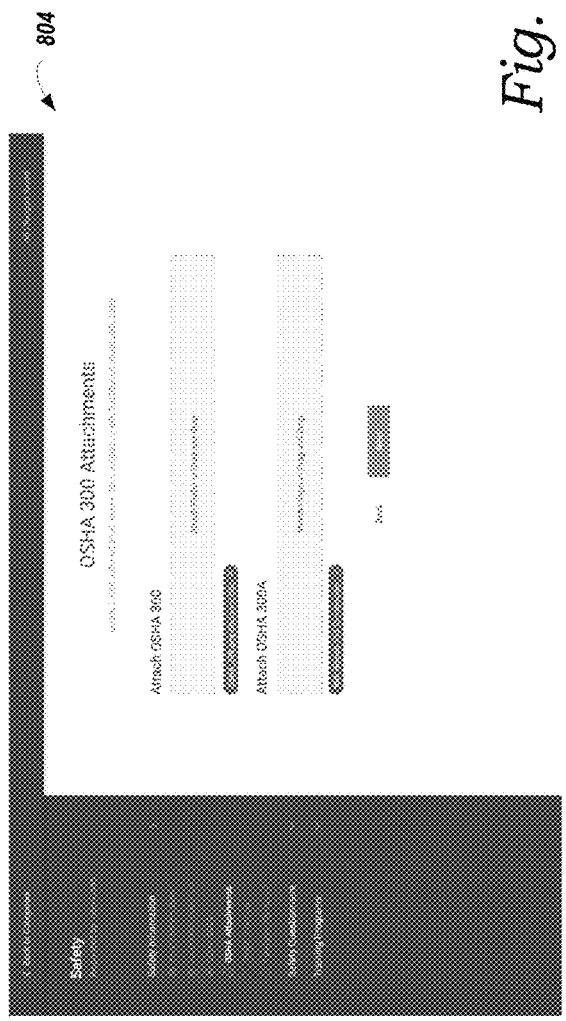
FIG. 8D depicts an example snapshot of an interface that may be presented to a user in accordance with one embodiment.
FIG. 8E depicts an example snapshot of an interface that may be presented to a user in accordance with one embodiment.

Snapshot 804 in FIG. 8D, for instance, depicts an example screen that may be presented by the interface to allow a user associated with the subcontractor to upload documents to the software tool related to the OSHA 300 information.

Snapshot 805 in FIG. 8E, for instance, depicts an example screen that may be presented by the interface to allow a user associated with the subcontractor to provide to the software tool OSHA Citation information.

Figure 8F:
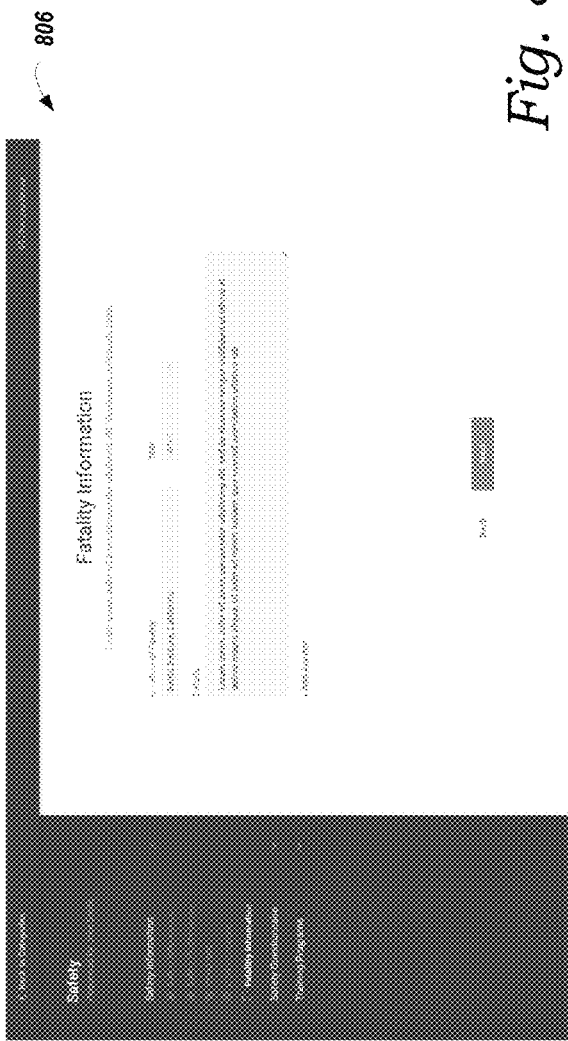
FIG. 8F depicts an example snapshot of an interface that may be presented to a user in accordance with one embodiment.

Snapshot 806 in FIG. 8F, for instance, depicts an example screen that may be presented by the interface to allow a user associated with the subcontractor to provide to the software tool Fatality information.

Figure 8G:
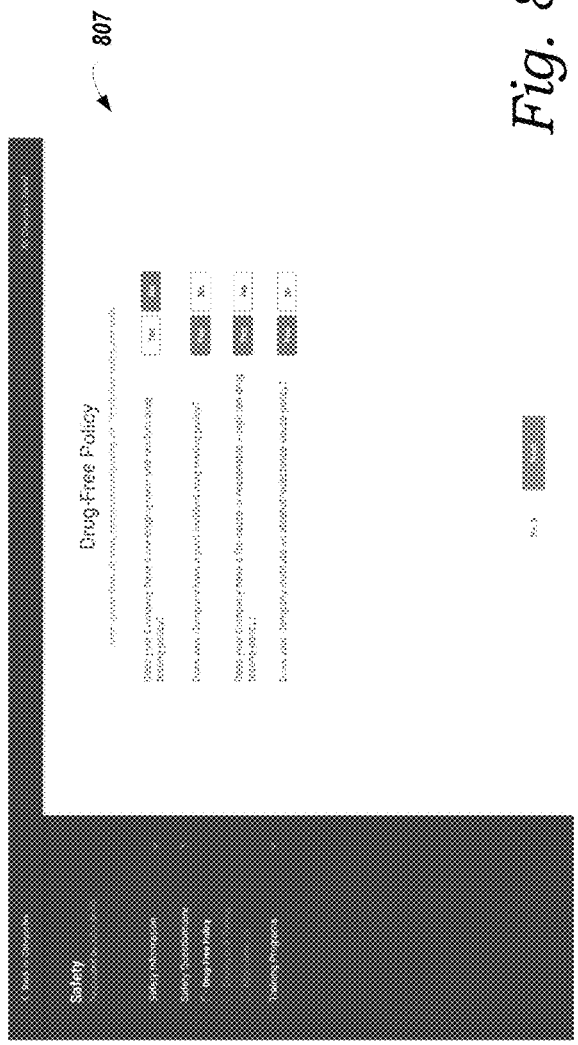
FIG. 8G depicts an example snapshot of an interface that may be presented to a user in accordance with one embodiment.

Snapshot 807 in FIG. 8G, for instance, depicts an example screen that may be presented by the interface to allow a user associated with the subcontractor to provide to the software tool Drug-Free Policy information.

Figure 8H:
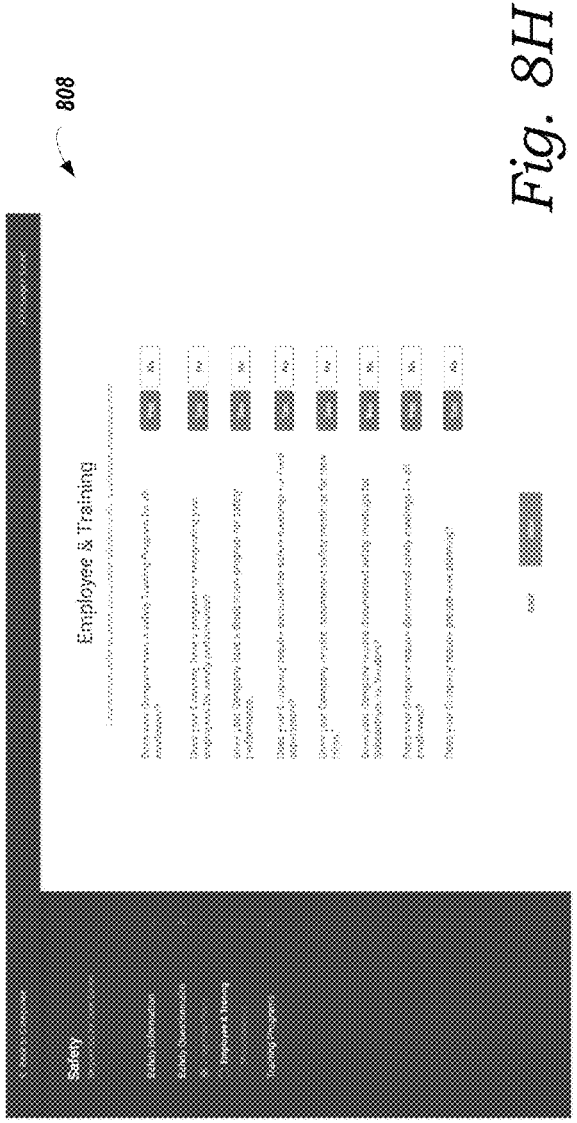
FIG. 8H depicts an example snapshot of an interface that may be presented to a user in accordance with one embodiment.

Snapshot 808 in FIG. 8H, for instance, depicts an example screen that may be presented by the interface to allow a user associated with the subcontractor to provide to the software tool Employee & Training information.

Figure 8I:
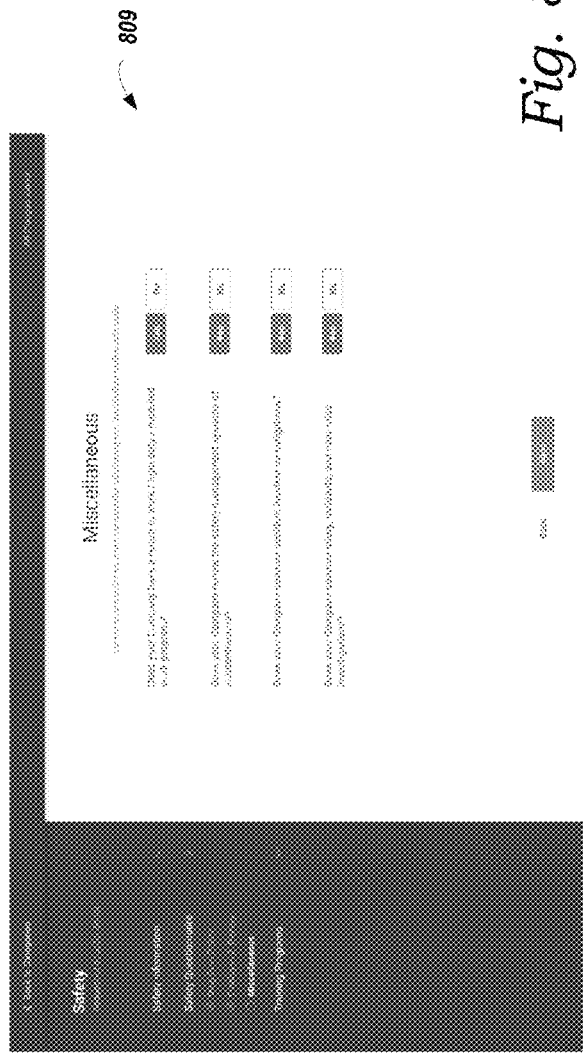
FIG. 8I depicts an example snapshot of an interface that may be presented to a user in accordance with one embodiment.

Snapshot 809 in FIG. 8I, for instance, depicts an example screen that may be presented by the interface to allow a user associated with the subcontractor to provide to the software tool Miscellaneous information.

Figure 8J:
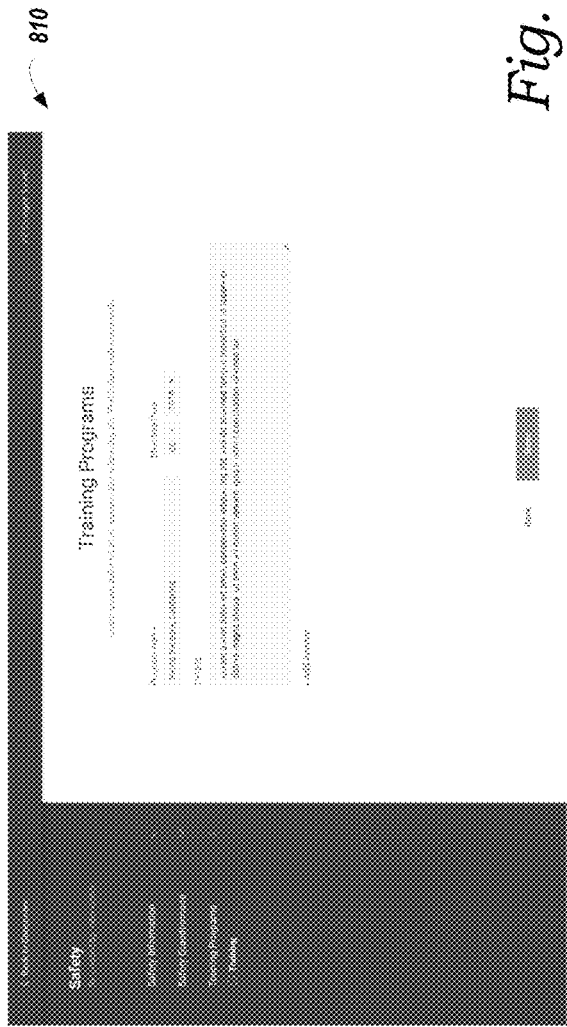
FIG. 8J depicts an example snapshot of an interface that may be presented to a user in accordance with one embodiment.

Snapshot 810 in FIG. 8J, for instance, depicts an example screen that may be presented by the interface to allow a user associated with the subcontractor to provide to the software tool Training Programs information.

Figure 9A:
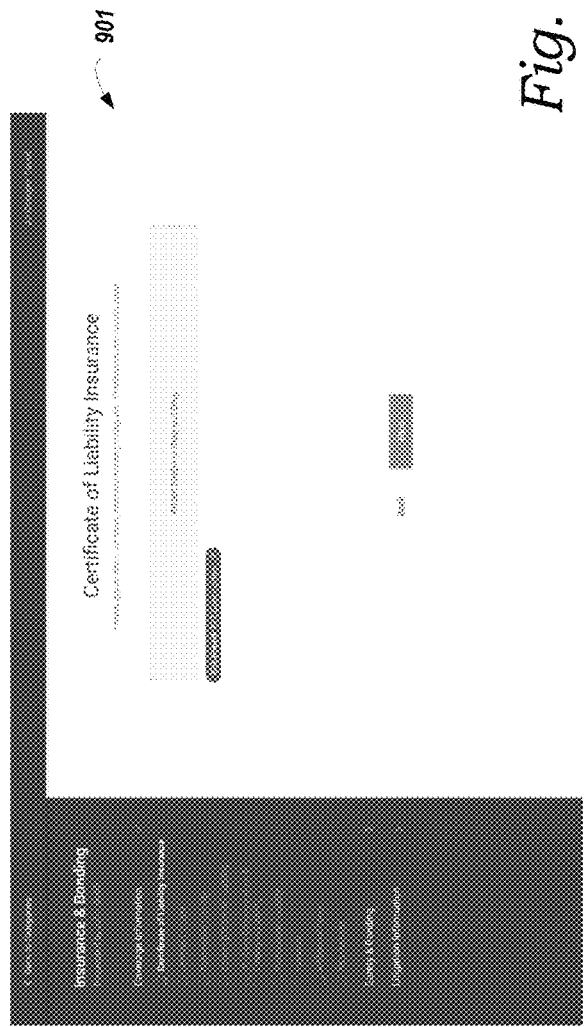
FIG. 9A depicts an example snapshot of an interface that may be presented to a user in accordance with one embodiment.

Snapshot 901 in FIG. 9A, for instance, depicts an example screen that may be presented by the interface to allow a user associated with the subcontractor to provide to the software tool Certificate of Liability Insurance information.

Snapshot 902 in FIG. 9B, for instance, depicts an example screen that may be presented by the interface to allow a user associated with the subcontractor to provide to the software tool General Liability information.

Snapshot 903 in FIG. 9C, for instance, depicts an example screen that may be presented by the interface to allow a user associated with the subcontractor to provide to the software tool Automobile Liability information.

Snapshot 904 in FIG. 9D, for instance, depicts an example screen that may be presented by the interface to allow a user associated with the subcontractor to provide to the software tool Excess (Umbrella) Liability information.

Snapshot 905 in FIG. 9E, for instance, depicts an example screen that may be presented by the interface to allow a user associated with the subcontractor to provide to the software tool Workers Compensation & Employee Liability information.

Figure 9F:
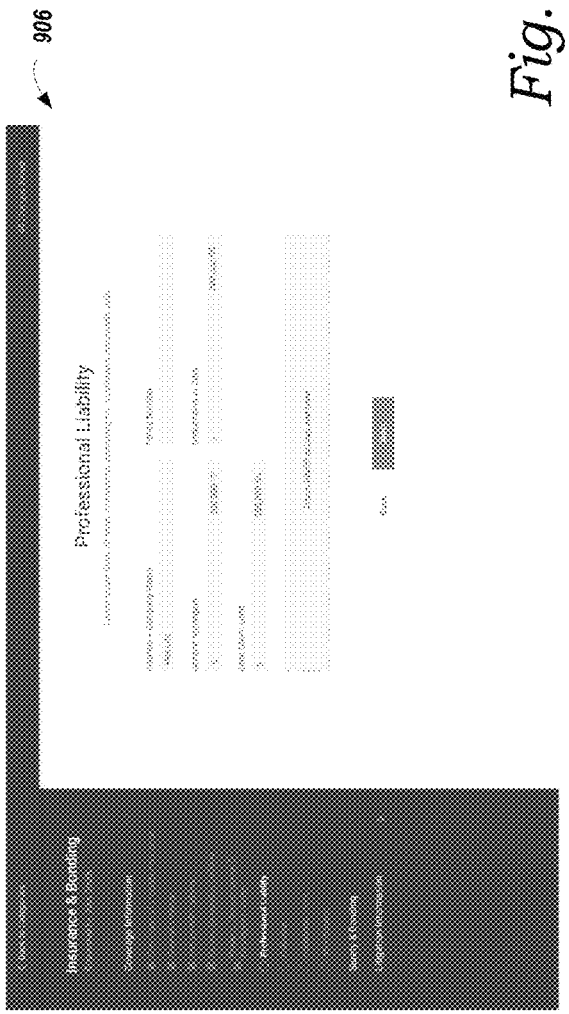
FIG. 9F depicts an example snapshot of an interface that may be presented to a user in accordance with one embodiment.

Snapshot 906 in FIG. 9F, for instance, depicts an example screen that may be presented by the interface to allow a user associated with the subcontractor to provide to the software tool Professional Liability information.

Figure 9G:
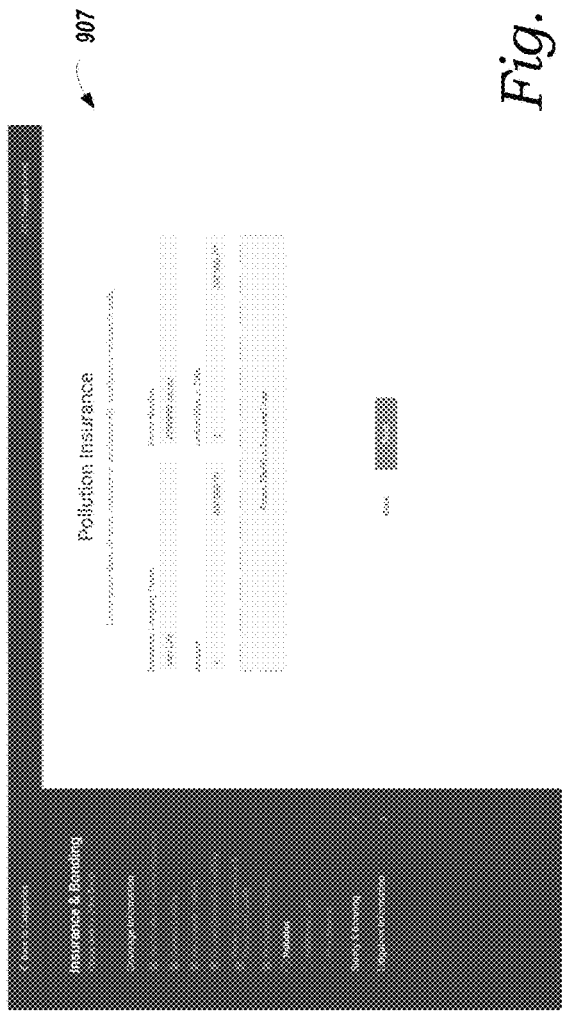
FIG. 9G depicts an example snapshot of an interface that may be presented to a user in accordance with one embodiment.

Snapshot 907 in FIG. 9G, for instance, depicts an example screen that may be presented by the interface to allow a user associated with the subcontractor to provide to the software tool Pollution Insurance information.

Figure 9H:
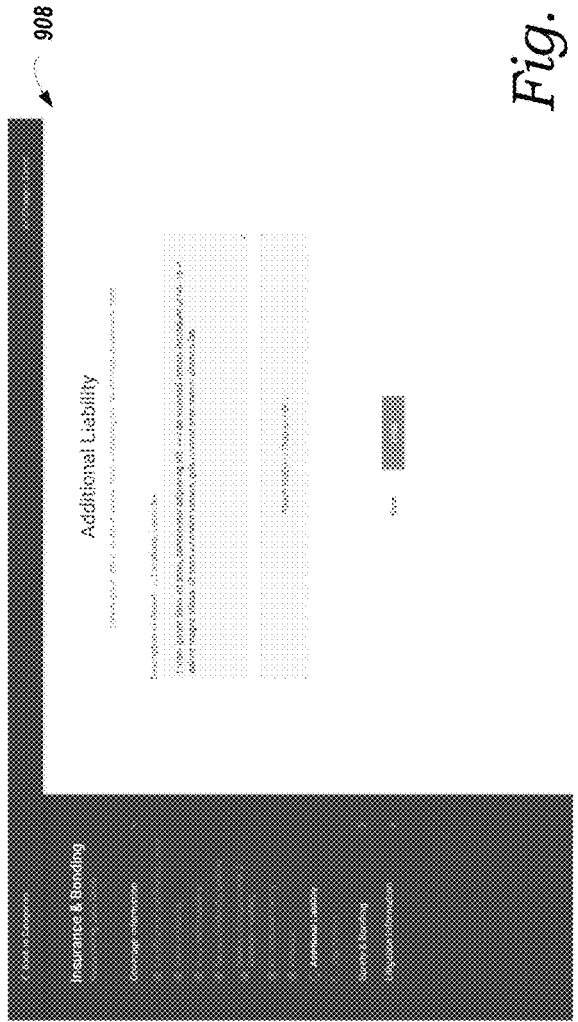
FIG. 9B depicts an example snapshot of an interface that may be presented to a user in accordance with one embodiment.
FIG. 9C depicts an example snapshot of an interface that may be presented to a user in accordance with one embodiment.
FIG. 9D depicts an example snapshot of an interface that may be presented to a user in accordance with one embodiment.
FIG. 9E depicts an example snapshot of an interface that may be presented to a user in accordance with one embodiment.
FIG. 9I depicts an example snapshot of an interface that may be presented to a user in accordance with one embodiment.
FIG. 9J depicts an example snapshot of an interface that may be presented to a user in accordance with one embodiment.
FIG. 9K depicts an example snapshot of an interface that may be presented to a user in accordance with one embodiment.
FIG. 9L depicts an example snapshot of an interface that may be presented to a user in accordance with one embodiment.

Snapshot 908 in FIG. 9H, for instance, depicts an example screen that may be presented by the interface to allow a user associated with the subcontractor to provide to the software tool Additional Liability information.

Figure 9I:
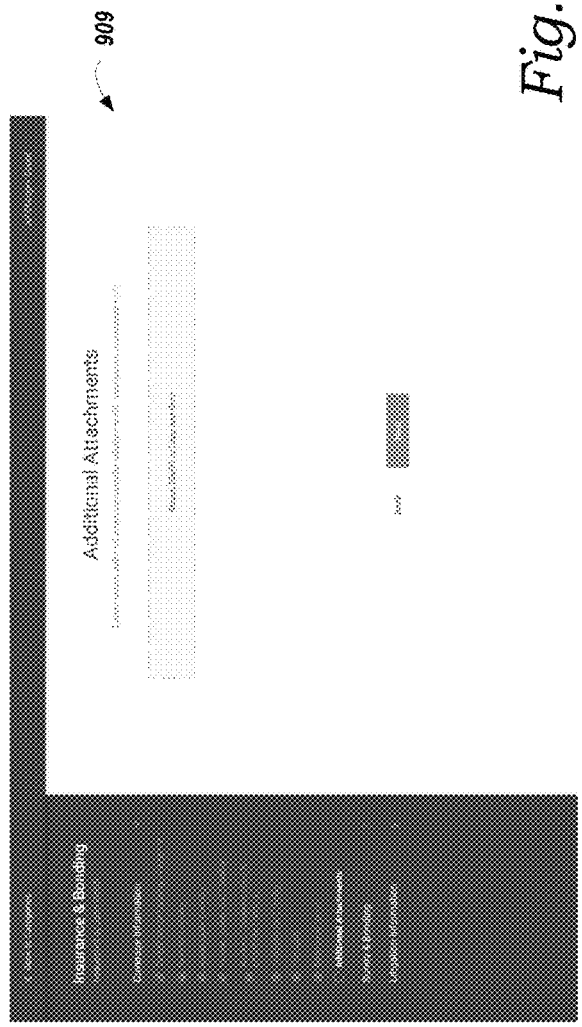

Snapshot 909 in FIG. 9I, for instance, depicts an example screen that may be presented by the interface to allow a user associated with the subcontractor to provide to the software tool additional attachments.

Figure 9J:
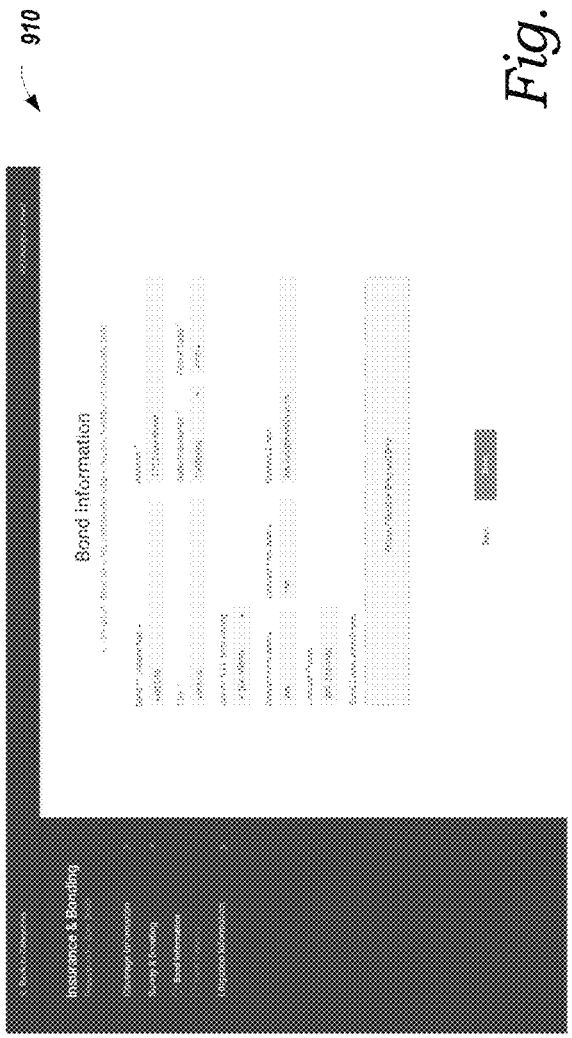

Snapshot 910 in FIG. 9J, for instance, depicts an example screen that may be presented by the interface to allow a user associated with the subcontractor to provide to the software tool Bind Information.

Figure 9K:

Snapshot 911 in FIG. 9K, for instance, depicts an example screen that may be presented by the interface to allow a user associated with the subcontractor to provide to the software tool Bond Capacity information.

Figure 9L:

Snapshot 912 in FIG. 9L, for instance, depicts an example screen that may be presented by the interface to allow a user associated with the subcontractor to provide to the software tool Litigation information.

Figure 10A:
FIG. 10A depicts an example snapshot of an interface that may be presented to a user in accordance with one embodiment.

Snapshot 1001 in FIG. 10A, for instance, depicts an example screen that may be presented by the interface to allow a user associated with the subcontractor to provide to the software tool Financial Statement information.

Figure 10B:
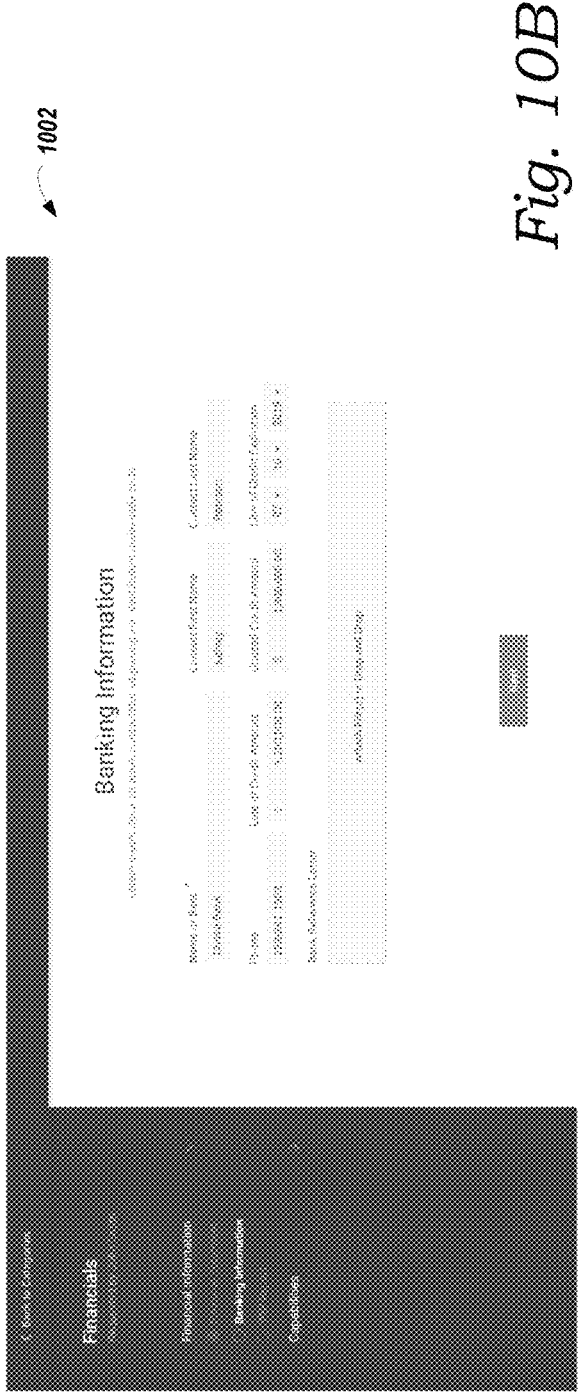
FIG. 10B depicts an example snapshot of an interface that may be presented to a user in accordance with one embodiment.

Snapshot 1002 in FIG. 10B, for instance, depicts an example screen that may be presented by the interface to allow a user associated with the subcontractor to provide to the software tool Banking information.

Figure 10C:
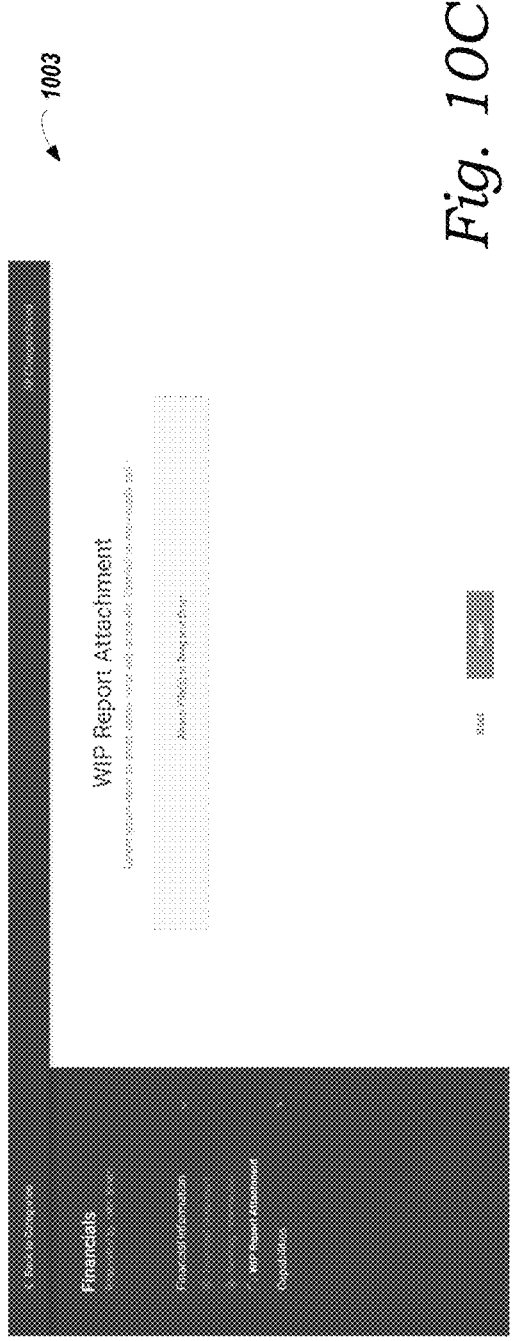
FIG. 10C depicts an example snapshot of an interface that may be presented to a user in accordance with one embodiment.

Snapshot 1003 in FIG. 10C, for instance, depicts an example screen that may be presented by the interface to allow a user associated with the subcontractor to provide to the software tool WIP Report attachments.

Figure 10D:
FIG. 10D depicts an example snapshot of an interface that may be presented to a user in accordance with one embodiment.

Snapshot 1004 in FIG. 10D, for instance, depicts an example screen that may be presented by the interface to allow a user associated with the subcontractor to provide to the software tool Contract Amount information.

Figure 10E:
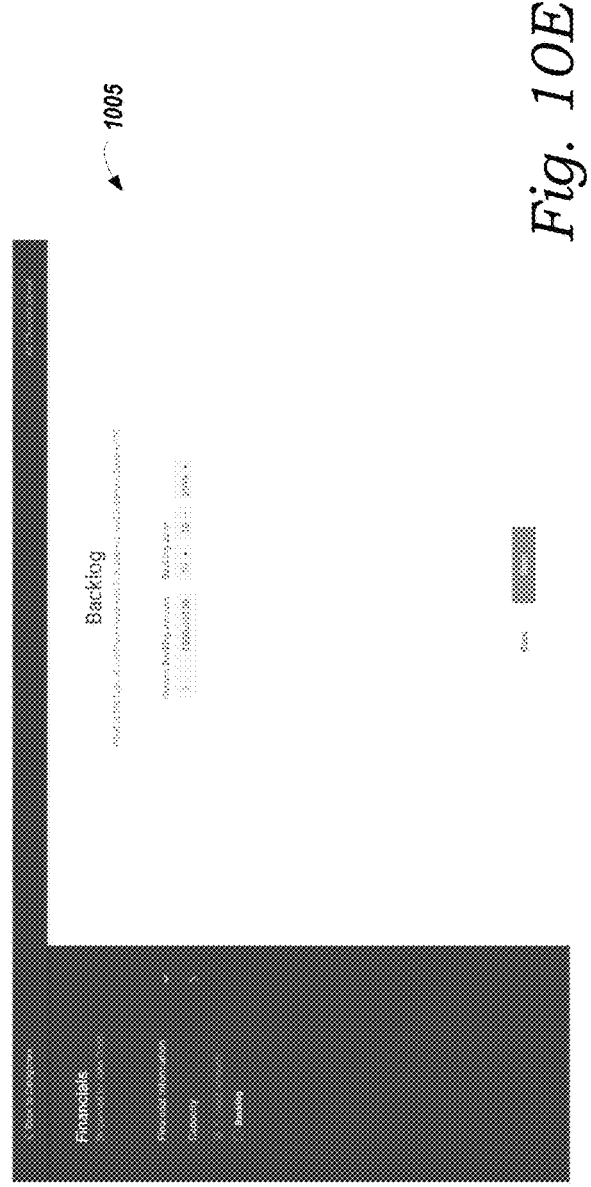
FIG. 10E depicts an example snapshot of an interface that may be presented to a user in accordance with one embodiment.

Snapshot 1005 in FIG. 10E, for instance, depicts an example screen that may be presented by the interface to allow a user associated with the subcontractor to provide to the software tool Backlog information.

It should be appreciated that the foregoing example screens were examples and that in practice, the disclosed software tool may present through the interface other screens that may facilitate the collection of other types of information.

Figure 11A:
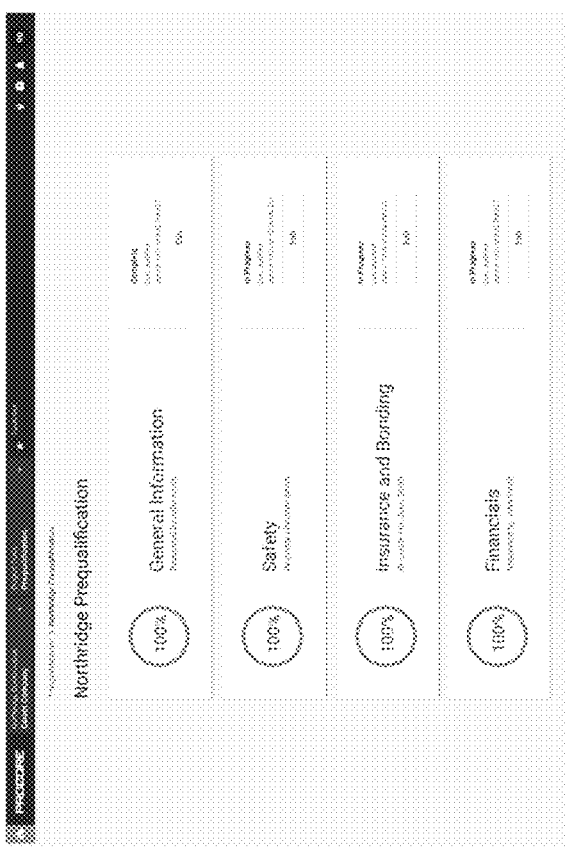
FIG. 11A depicts an example snapshot of an interface that may be presented to a user in accordance with one embodiment.

Once a user has completed all sections of a prequalification form, the interface present various graphical indications to indicate that all sections are complete. For instance, as snapshot 1101 in FIG. 11A depicts, the interface may present graphical indications of 100% for each section of the prequalification form. The interface may also present the option to submit the prequalification form back to the GC. For instance, the interface may present a selectable "Submit" button, which when selected may cause the software tool to submit the prequalification form back to the GC.

Figure 11B:
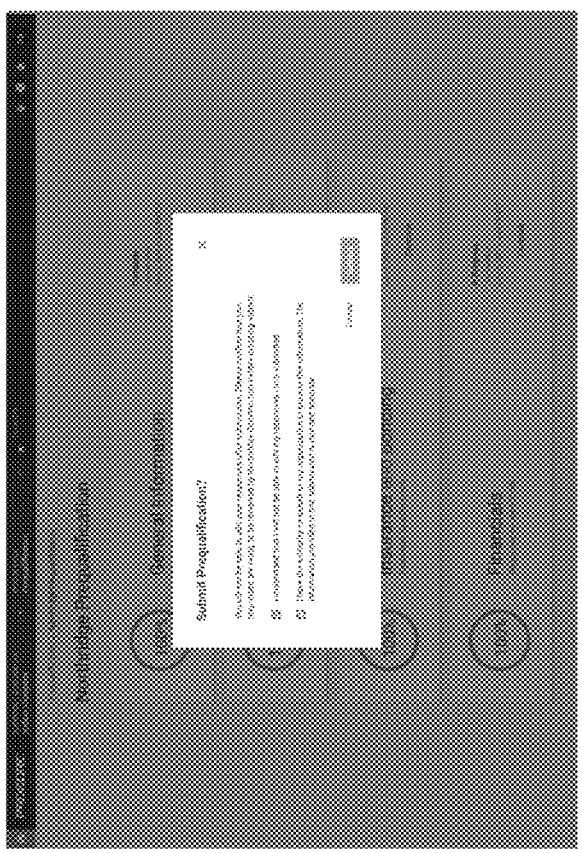
FIG. 11B depicts an example snapshot of an interface that may be presented to a user in accordance with one embodiment.

In some embodiments, prior to submitting the prequalification form back to the GC, but responsive to receiving a user input selecting a "Submit" button or the like, the software tool may present a confirmation prompt, which may require the user to acknowledge (e.g., by checking a box, or the like) certain requirements. The prompt may include a selectable "Submit" button or the like, which when selected may cause the software tool to submit the prequalification form back to the GC. Snapshot 1102 in FIG. 11B depicts one example of a confirmation prompt, but other examples are possible as well.

Figure 12:
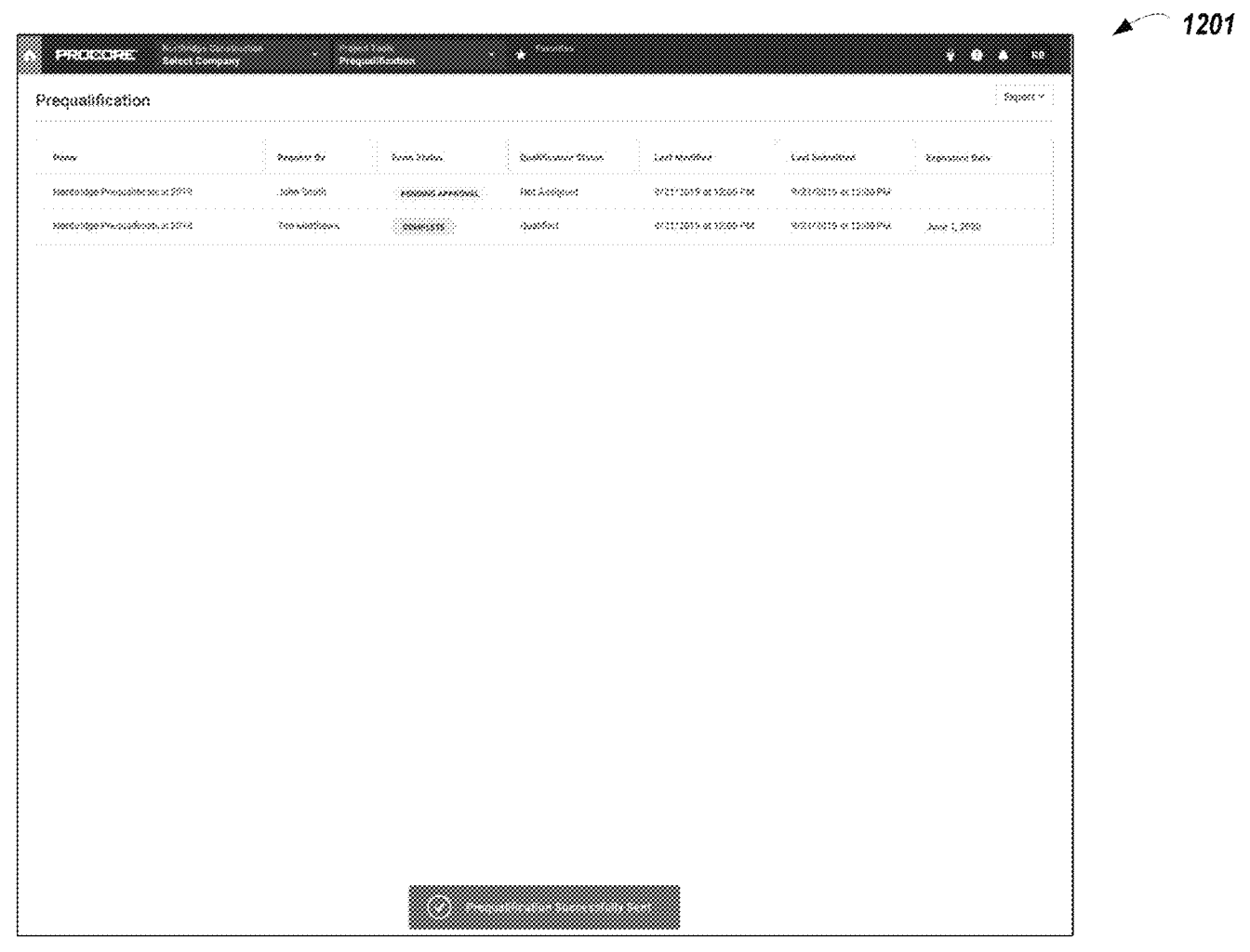

Snapshot 1201 in FIG. 12 depicts an example landing page that may be presented upon submission of a completed prequalification form. As depicted, the landing page may include a "Prequalification Successfully Sent" indication as well as an indication of "Pending Approval" in the "Form Status" location for the given prequalification form. Other examples of landing pages that may be presented upon submission of a completed prequalification form are possible as well.

D. Applying Rules to a Prequalification Submission

In still another aspect, after a subcontractor has provided its prequalification submission to the GC, the disclosed prequalification software tool may apply certain rules to the subtractor's prequalification information that at least partially govern whether or not the subcontractor's prequalification submission is approved or rejected. These rules may take various different forms.

As one possibility, the disclosed prequalification software tool may be configured to apply a rule for evaluating an individual field of the prequalification information submitted by a subcontractor. For instance, one example of a rule for evaluating an individual field of prequalification information may dictate that the prequalification software tool is to automatically reject a subcontractor's prequalification submission (or at least flag the subcontractor's prequalification submission for further review) if the total revenue entered by the subcontractor is below a given revenue amount. Another example of a rule for evaluating an individual field of prequalification information may dictate that the prequalification software tool is to automatically reject a subcontractor's prequalification submission (or at least flag the subcontractor's prequalification submission for further review) if the number of safety incidents entered by the subcontractor is above a given number. A rule for evaluating an individual field of prequalification information may take various other forms as well.

As another possibility, the disclosed prequalification software tool may be configured to apply a rule for evaluating a group of multiple fields of the prequalification information submitted by a subcontractor via one or more logical operators (e.g., an AND operator, OR operator, etc.). For instance, one example of a rule for evaluating a group of multiple fields of prequalification information may dictate that the prequalification software tool is to automatically reject a subcontractor's prequalification submission (or at least flag the subcontractor's prequalification submission for further review) unless (a) the total revenue entered by the subcontractor is above a given revenue amount AND (b) the number of safety incidents entered by the subcontractor is below a given number. Or on the other hand, another example of a rule for evaluating a group of multiple fields of prequalification information may dictate that the prequalification software tool is to automatically accept a subcontractor's bid prequalification submission if (a) the total revenue entered by the subcontractor is above a given revenue amount AND (b) the number of safety incidents entered by the subcontractor is below a given number. A rule for evaluating a group of multiple fields of prequalification information may take various other forms as well.

The rules that may be applied by the disclosed prequalification software tool to a subcontractor's prequalification information may take other forms as well. For instance, as one possibility, certain rules applied by the disclosed prequalification software tool may evaluate other information about a subcontractor in addition (or in alternative) to the prequalification information when determining whether to approve or reject the subcontractor's prequalification submission. For example, to the extent that a subcontractor has a preexisting account with the provider of the prequalification software tool, a given rule applied by the disclosed prequalification software tool may evaluate certain information stored under the subcontractor's preexisting account (e.g., historical financial or safety information for the subcontractor) when determining whether to approve or reject the subcontractor's prequalification submission. The information evaluated and/or the criteria applied by such rules may take various other forms as well.

Further, in practice, the rules that may be applied by the disclosed prequalification software tool to a subcontractor's prequalification information may be defined based on input from the GC, predefined by the provider of the software tool, and/or derived based on a computing system's analysis of historical data, among other possibilities.

E. Reviewing a Prequalification Submission

In a further aspect, after a subcontractor has submitted its prequalification submission to the GC, the disclosed prequalification software tool may provide an interface through which a user associated with the GC may review the subcontractor's prequalification submission and then, if desired, either approve or reject the subcontractor's prequalification submission (or perhaps flag it for follow up).

Figures 13, 14A:
FIG. 13 depicts an example snapshot of an interface that may be presented to a user in accordance with one embodiment.
FIG. 14A depicts an example snapshot of an interface that may be presented to a user in accordance with one embodiment.

For instance, in one respect the disclosed interface may present a list of all subcontractors and an indication of the qualification status of each subcontractor (e.g., "Not Assigned," "Qualified," "Qualified with Exceptions," and "Not Qualified," among other possible examples). The interface may, for each respective subcontractor that submitted a prequalification form, present a selectable option for displaying the prequalification review interface for that respective subcontractor. Snapshot 1301 in FIG. 13 depicts an example prequalification review interface that depicts an example list of various subcontractors and associated qualification statuses.

A subcontractor's prequalification form may be assigned to a given user associated with the GC for purposes of review, and this assignment may be based on user input or it may happen automatically based on certain preestablished criteria defining one or more reviewers to review a first portion of a prequalification form (e.g., general information) and a one or more other reviewers to review a second portion of the prequalification form (e.g., the financial portions).

In some embodiments, the prequalification review interface may include various screens that may be presented to the reviewing user or users to facilitate (i) review of each section of the subcontractor's prequalification form and (ii) modify the qualification status of the subcontractor. For instance, for a given subcontractor's prequalification submission, the prequalification review interface may first display an overview page for the given subcontractor. The overview page may display, among other possibilities, the name of the subcontractor, submission information, an overview of the subcontractor, any comments that may have been added to the prequalification form by a reviewer, and an indication of the qualification status of the subcontractor. Snapshot 1401 in FIG. 14A depicts an example overview page for "Donalson Contractors." As depicted, the qualification status for this subcontractor is "Not Assigned," although other example qualification statuses are possible as well.

Figure 14B:
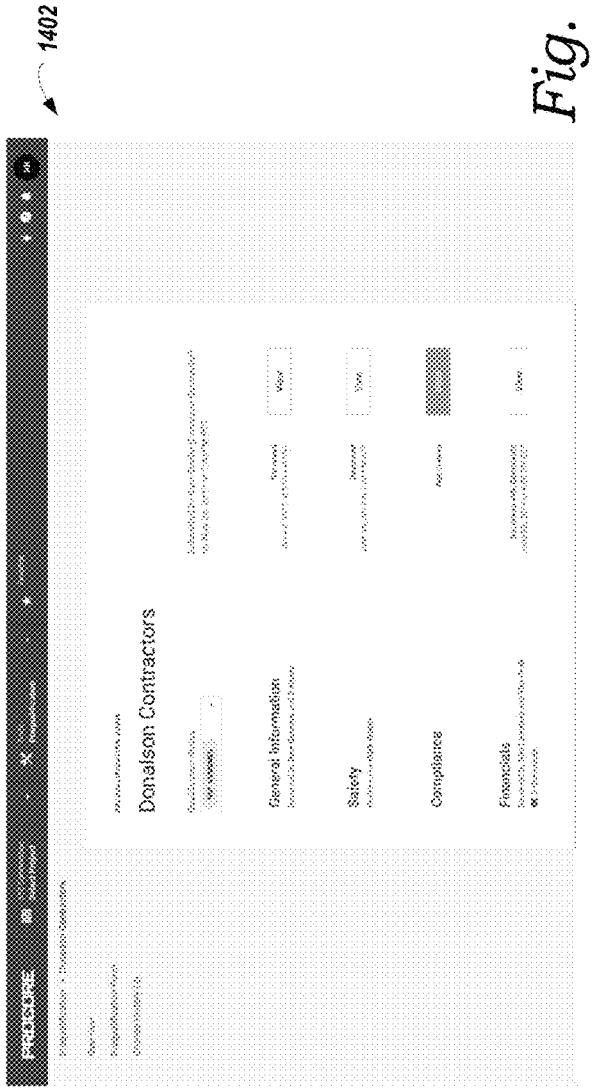
FIG. 14B depicts an example snapshot of an interface that may be presented to a user in accordance with one embodiment.

The prequalification review interface may next display a prequalification form category screen from which a user can navigate to various parts of the prequalification form based on category. Snapshot 1402 in FIG. 14B, for instance, depicts an example prequalification form category screen. From this screen, a user can navigate to the "General Information," the "Safety," the "Compliance," or the "Financials" portions of the prequalification form by, for instance, selecting a corresponding "View" button. In some embodiments, the interface may display a "View" button in a first color when it corresponds to a category that has already been reviewed and display a "View" button in a second color when it corresponds to a category that has not yet been reviewed.

Figure 14C:
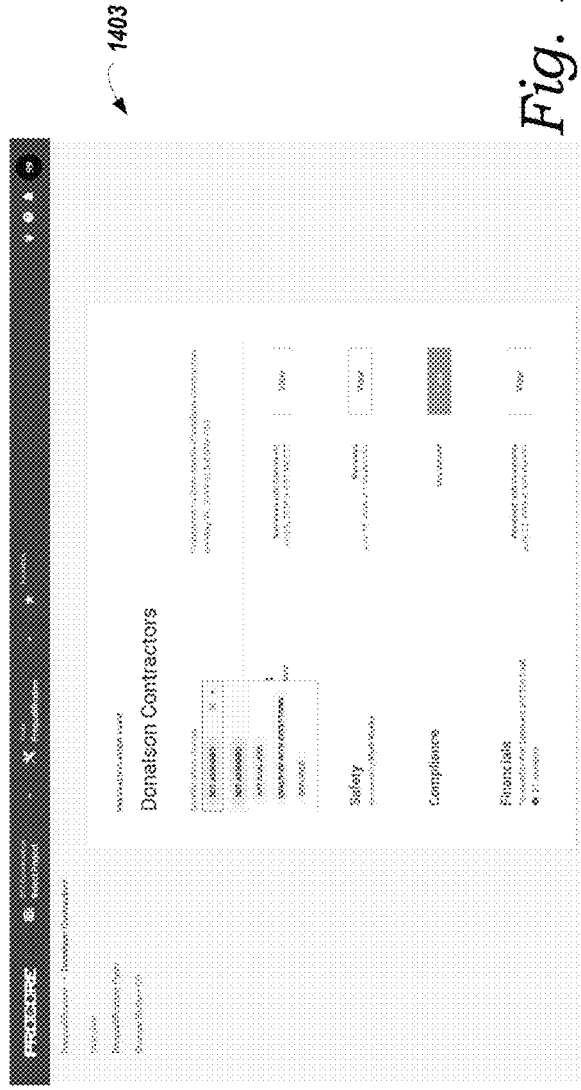
FIG. 14C depicts an example snapshot of an interface that may be presented to a user in accordance with one embodiment.

In some embodiments, the interface may permit a reviewer to change the qualification status of a subcontractor from the prequalification form category screen or the overview screen. For instance, as depicted in snapshot 1403 of FIG. 14C, the interface may include a dropdown box with selectable qualification statuses. When a user selects one of these statuses, this may cause the software tool to change the qualification status of the subcontractor. Depending on the implementation, the interface may permit the qualification status to be changed only after each category of the prequalification form has been reviewed. That is, if any category of the prequalification form has not been reviewed, the interface may disallow the prequalification status to be changed. However, in some implementations, the interface may permit the prequalification status to be changed even if one or more categories of the prequalification form have not been reviewed.

As indicated, when a user navigates to a particular category of the prequalification form (e.g., by selecting the "View" button corresponding to "General Information" to navigate to the "General Information" portion of the prequalification form), the interface may responsively display a page that shows the information that has been submitted in the prequalification form for that particular category. Snapshots 1501 and 1502 of FIGS. 15A and 15B, respectively, depict an example "General Information" page that may display the information submitted under the "General Information" category of a prequalification form. The interface may present other pages that display information submitted under the other categories in response to selection of a corresponding "View" button as well.

Figure 16A:
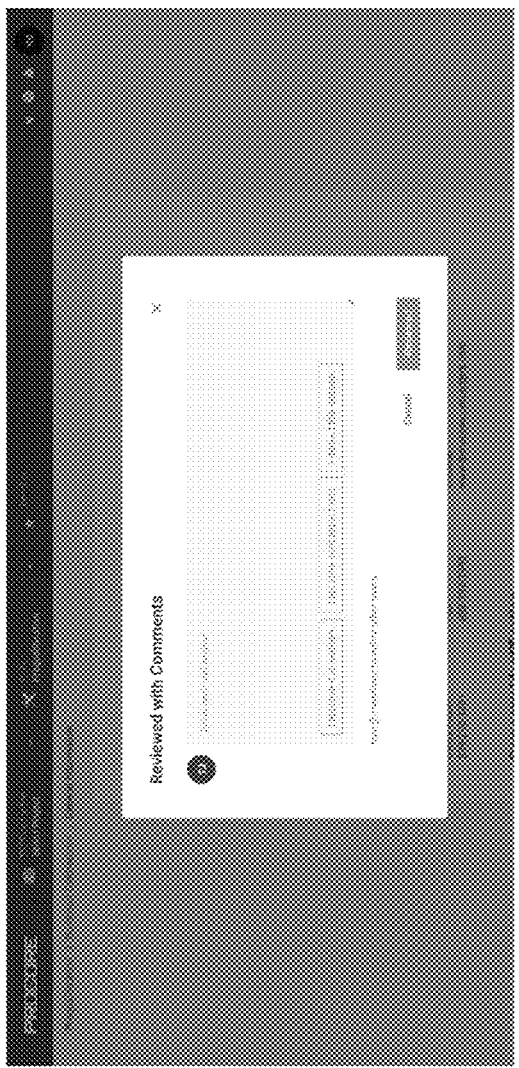
FIG. 16A depicts an example snapshot of an interface that may be presented to a user in accordance with one embodiment.
Figure 16B:
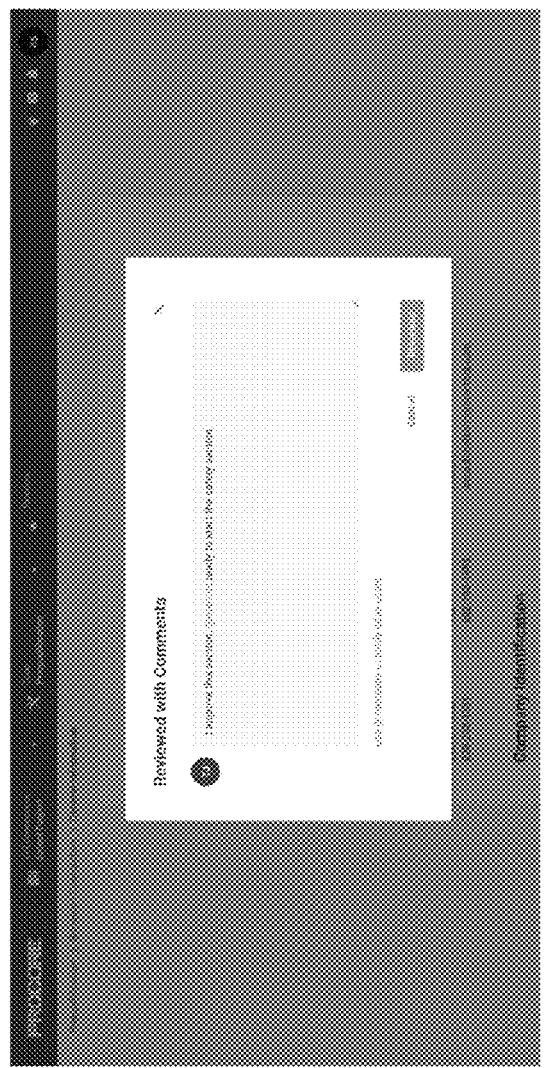
FIG. 16B depicts an example snapshot of an interface that may be presented to a user in accordance with one embodiment.

The interface may also display a selectable "Reviewed" button, or the like, on each page that displays a particular category of the prequalification form. When this button is selected, the interface may present a prompt to enter comments and to mark the category of the prequalification as reviewed. For instance, snapshot 1601 of FIG. 16A depicts an example prompt to enter comments, and snapshot 1602 of FIG. 16B depicts an example prompt with an example comment. When the software tool receives a user input selecting the "Reviewed" button of the prompt, the software tool may update the status of the prequalification form accordingly and make any submitted comments available for viewing.

Figure 17A:
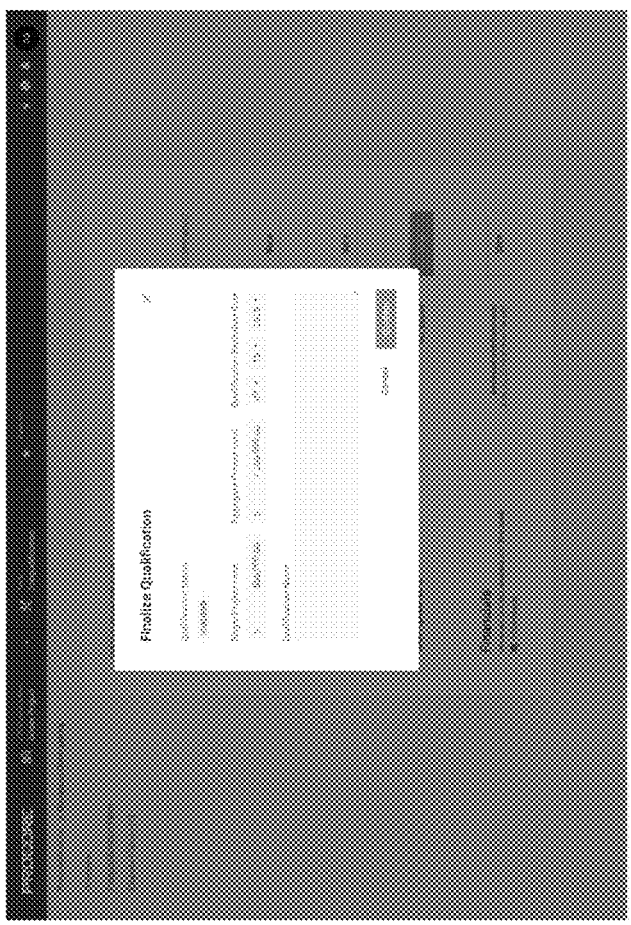
FIG. 17A depicts an example snapshot of an interface that may be presented to a user in accordance with one embodiment.
Figure 17B:
FIG. 17B depicts an example snapshot of an interface that may be presented to a user in accordance with one embodiment.
Figure 18:
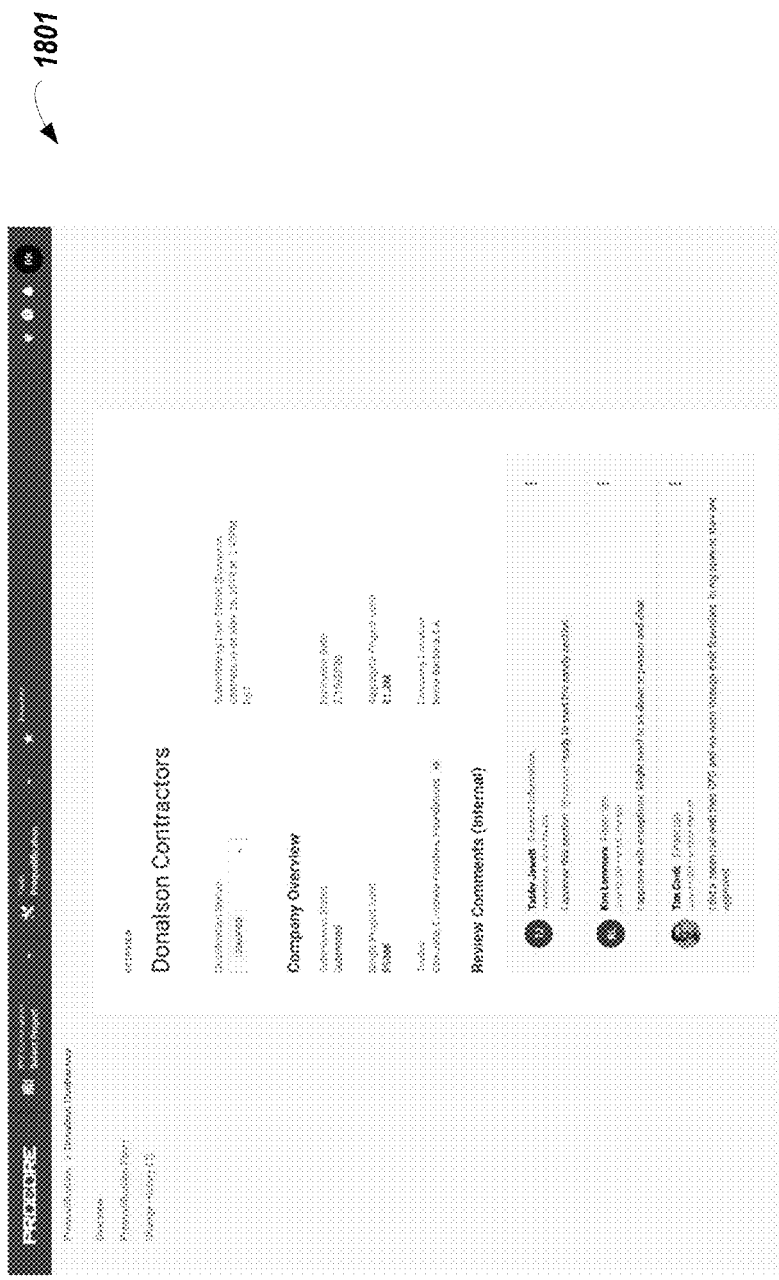
FIG. 18 depicts an example snapshot of an interface that may be presented to a user in accordance with one embodiment.

Once all categories of a given prequalification form have been reviewed, the interface may display a "Finalize Qualification" prompt, an example of which is depicted in snapshot 1701 of FIG. 17A. This prompt may permit a reviewing user to enter various monetary limits that may accompany the GC's approval of the subcontractor and to enter any additional notes as desired. In some implementations, however, these monetary limits may be prepopulated into the prompt automatically by the software tool based on other information submitted in the prequalification form, such as insurance information, among others. Upon receiving a user input selecting the "Confirm" button, the software tool may update the prequalification status of the subcontractor to "Qualified." This status may then be visible on other screens, including, for instance, (i) the prequalification form category screen, as depicted again but with the qualification status changed to "Qualified" in snapshot 1702 of FIG. 17B, and (ii) the overview screen, as depicted again but with the qualification status changed to "Qualified" and including an additional comment, in snapshot 1801 of FIG. 18.

F. Other Features

It should be understood that the disclosed prequalification software tool may include other features that help to facilitate a prequalification process as well.

Figure 19:
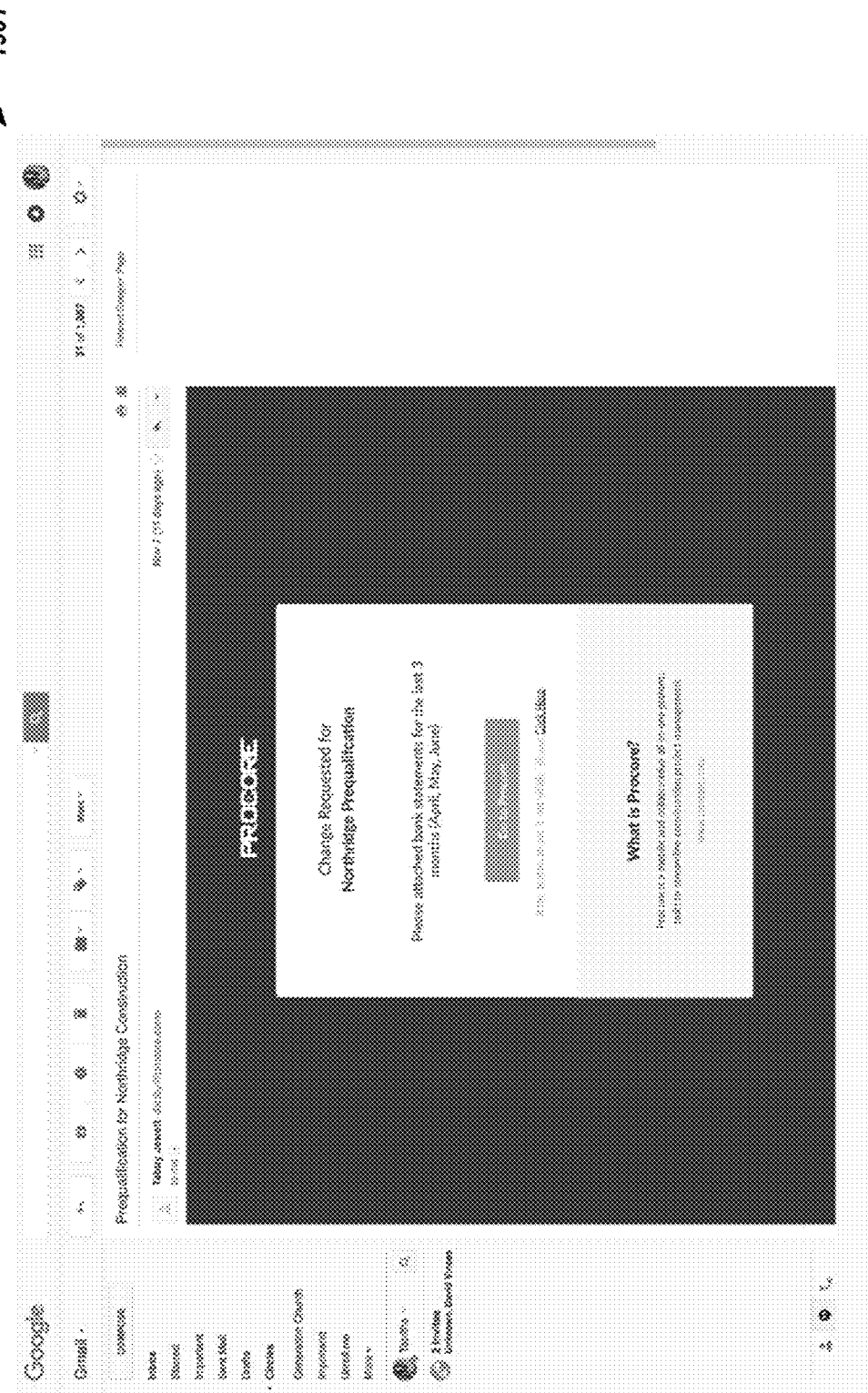
FIG. 19 depicts an example snapshot of an interface that may be presented to a user in accordance with one embodiment.

For instance, as one possibility, the disclosed prequalification software tool may also enable a GC to update a prequalification form that has already been filled out by subcontractors, which may in turn cause the disclosed prequalification software tool to invite such subtractors to return to the prequalification form and provide additional prequalification information. The invitation that is issued by the disclosed prequalification software tool in order to request that a subcontractor return to a prequalification form may take various forms. As one possibility, such an invitation may take the form of an email that is sent to a user associated with the subcontractor and includes a link for accessing the prequalification software tool, an example of which is depicted in snapshot 1901 of FIG. 19.

Figures 20A, 20B:
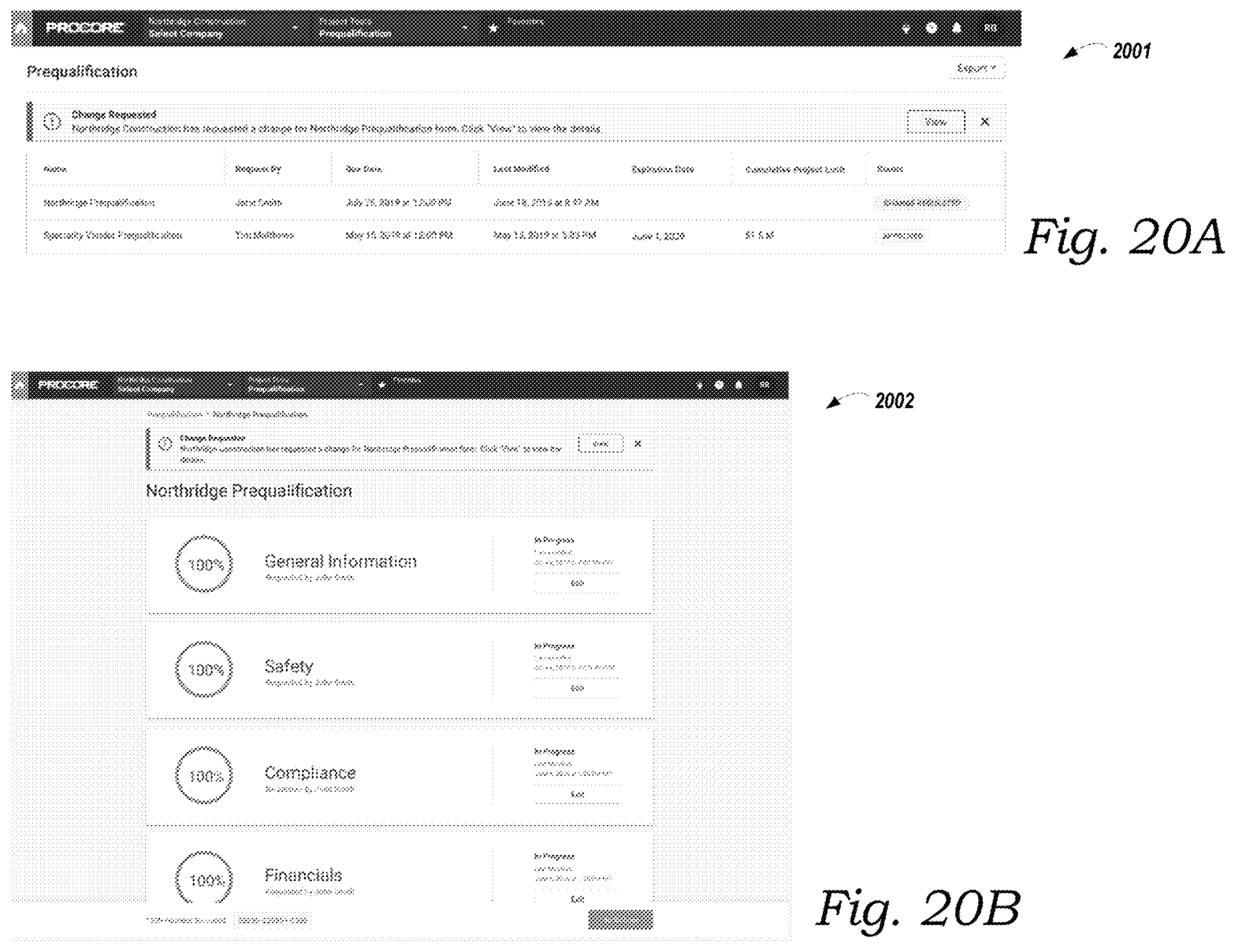

Once a user associated with a subcontractor accesses the disclosed prequalification software tool, the tool may then present the user with an interface that is similar to the one described above for filling in the prequalification form, although such an interface may also provide detail regarding the change to the prequalification form and/or the additional prequalification being requested from the subcontractor. For instance, snapshot 2001 depicts an example prequalification landing page that shows various prequalification forms along with the status of these forms. As depicted, the status of example form "Northridge Prequalification" is "Change Requested," whereas the status of "Specialty Vendor Prequalification is "Approved." Upon selection of the "Northridge Prequalification" form, the interface may display the prequalification form category screen and a prompt that indicates that a change has been requested, an example of which is depicted in snapshot 2002 of FIG. 20B. The prompt may also include a selectable "View" button, which when selected by a user, may cause the software tool to display the portion of the prequalification page containing information for which a change has been requested and/or additional information concerning the change.

IV. SOFTWARE ENGINE FOR LEVERAGING PREQUALIFICATION INFORMATION

As discussed above, the disclosed prequalification software tool may be implemented as part of a suite of software tools that have been developed to assist with the task of managing construction projects. For instance, Procore has developed a construction management software application that includes a suite of different software tools for facilitating the management of construction projects—examples of which may include a "Punch List" tool that facilitates management of punch items, a "Daily Log" tool that facilitates management of daily activities (e.g., labor, communication, equipment, materials, etc.), an "Invoicing" tool that facilitates management of invoicing, a "Commitments" tool that facilitates management of contracts and purchase orders, and a "Change Orders" tool that facilitates management of change orders, among many others—and it is possible that the disclosed prequalification software tool may be implemented as one of the tools included within Procore's construction management software application. The disclosed prequalification software tool may be implemented as part of other software applications as well.

Advantageously, by implementing the disclosed prequalification software tool as part of a suite of construction management software tools, the prequalification information that is obtained via the disclosed prequalification software tool can also be leveraged by the other construction management software tools in the suite to help improve the other construction management tasks facilitated by these tools. In this respect, the software technology disclosed herein also includes a software engine that is configured to evaluate the prequalification information submitted by an approved subcontractor via the disclosed prequalification software tool, and then based on that evaluation, automatically configure aspects of one or more other software tools that are used by the GC and/or the subcontractor to facilitate management of a construction project. The evaluation may be based on, for instance, one or both of a set of default, pre-programmed rules, or a set of rules established by a user, such as a GC, during creation of a prequalification form, or perhaps, at other times. For instance, one or more interfaces (such as the interfaces discussed above, although different interfaces may be used as well) may be presented to a user through which the user may provide various user inputs to establish rules or other criteria that the software engine may use to evaluate the submitted prequalification information, and then based on that evaluation, automatically configure aspects of one or more other software tools that are used by the GC and/or the subcontractor to facilitate management of a construction project. Rules may be established in other ways as well.

In any case, this evaluation and subsequent configuration may then take any of a variety of possible forms. For instance, as one possibility, the disclosed software engine may evaluate the financial information submitted by an approved subcontractor as part of its prequalification submission, and if the software engine determines that the subcontractor's financial information does not meet certain criteria, which as explained above, may include rules established by a user (e.g., the subcontractor's cash flow is below a certain amount), the software engine may then automatically configure an "Invoicing" tool used by the GC to employ a more-frequent invoicing schedule (e.g., bi-weekly rather than 45 days) for invoices directed to the approved subcontractor or take some other action as defined in the rules established by a user. As another example, the software engine may generate a notification to a user of the Invoicing tool indicating that the subcontractor's cash flow is below a certain amount, and present a user (with a given permissions template) with an option to change the invoicing schedule.

As another possibility, the disclosed software engine may evaluate the safety information submitted by an approved subcontractor as part of its prequalification submission, and if the software engine determines that this safety information does not meet certain criteria, which as explained above, may include rules established by a user (e.g., the number of safety incidents experienced by the subcontractor during a given timeframe exceeds a certain number), the software engine may then automatically configure certain software tools for tracking the subcontractor's work on a construction project (e.g., a "Punch Item" tool and/or a "Daily Log" tool) to require that additional safety actions be completed by the approved subcontractor while working on the construction project, or take some other action as defined in the rules established by a user. As another example, the software engine may generate a notification to a user of the given tool indicating that the subcontractor's safety information does not meet a certain criteria, and present a user (with a given permissions template) with an option to change the required additional safety measures.

As yet another possibility, the disclosed software engine may evaluate the insurance information submitted by an approved subcontractor as part of its prequalification submission, and if the software engine determines that this insurance information is outdated or incomplete, the software engine may automatically configure a "Commitments" tool used by the GC to prevent a payment from being made to the approved subcontractor until the subcontractor updates the insurance information, or take some other action as defined in the rules established by a user.

The information that may be evaluated by the disclosed software engine, the software tools that may be automatically configured by the disclosed software engine, and/or the manner in which the software tools may be automatically configured based on the subcontractor's prequalification information may take various other forms as well. For instance, as one possibility, the disclosed software engine may be configured to evaluate other information about an approved subcontractor in addition (or as an alternative) to the prequalification information when determining whether to automatically configure aspects of one or more other software tools that facilitate management of a construction project.

For example, to the extent that some limitation has been imposed by a GC on a subcontractor in connection with the GC's approval of that subcontractor, the disclosed software engine may function to automatically configure a "Change Orders" tool used by the GC and the subcontractor to prevent approval of a change order submitted by the subcontractor if that change order would violate the limitations imposed by the GC on the subcontractor. As another example, to the extent that an approved subcontractor has a preexisting account with the provider of a suite of construction management software tools, the disclosed software engine may evaluate certain information stored under the subcontractor's preexisting account (e.g., historical financial or safety information for the subcontractor) when determining whether to automatically configure certain software tools for managing the subcontractor's work on a construction project being managed by the GC. The information about a subcontractor that is evaluated by the disclosed software engine may take other forms as well.

Further, in practice, the criteria used by the disclosed software engine when determining whether to automatically configure aspects of one or more other software tools may be defined based on input from the GC, predefined by the provider of the suite of software tools, and/or derived based on a computing system's analysis of historical data, among other possibilities.

Certain variations on the functions performed by the disclosed software engine are possible as well. For instance, in some embodiments, the disclosed software engine may present a user associated with the GC with an opportunity to approve or reject a proposed change to the configuration of a software tool before implementing that change to the software tool. For example, before changing the invoice schedule used by an "Invoicing" tool for a subcontractor or adding safety actions that are required by a "Punch List" or "Daily Activities" tool for a subcontractor, the disclosed software engine may present a user associated with the GC with the option to approve or reject these changes.

The disclosed software engine may perform other functions and/or take other forms as well.

By leveraging an approved subcontractor's prequalification information in this manner, the disclosed software technology may improve a GC's ability to mitigate the real-world risk presented by a given subcontractor that is working on a construction project being managed by the GC, among various other advantages.

V. EXAMPLE FLOW CHARTS

Figure 21:
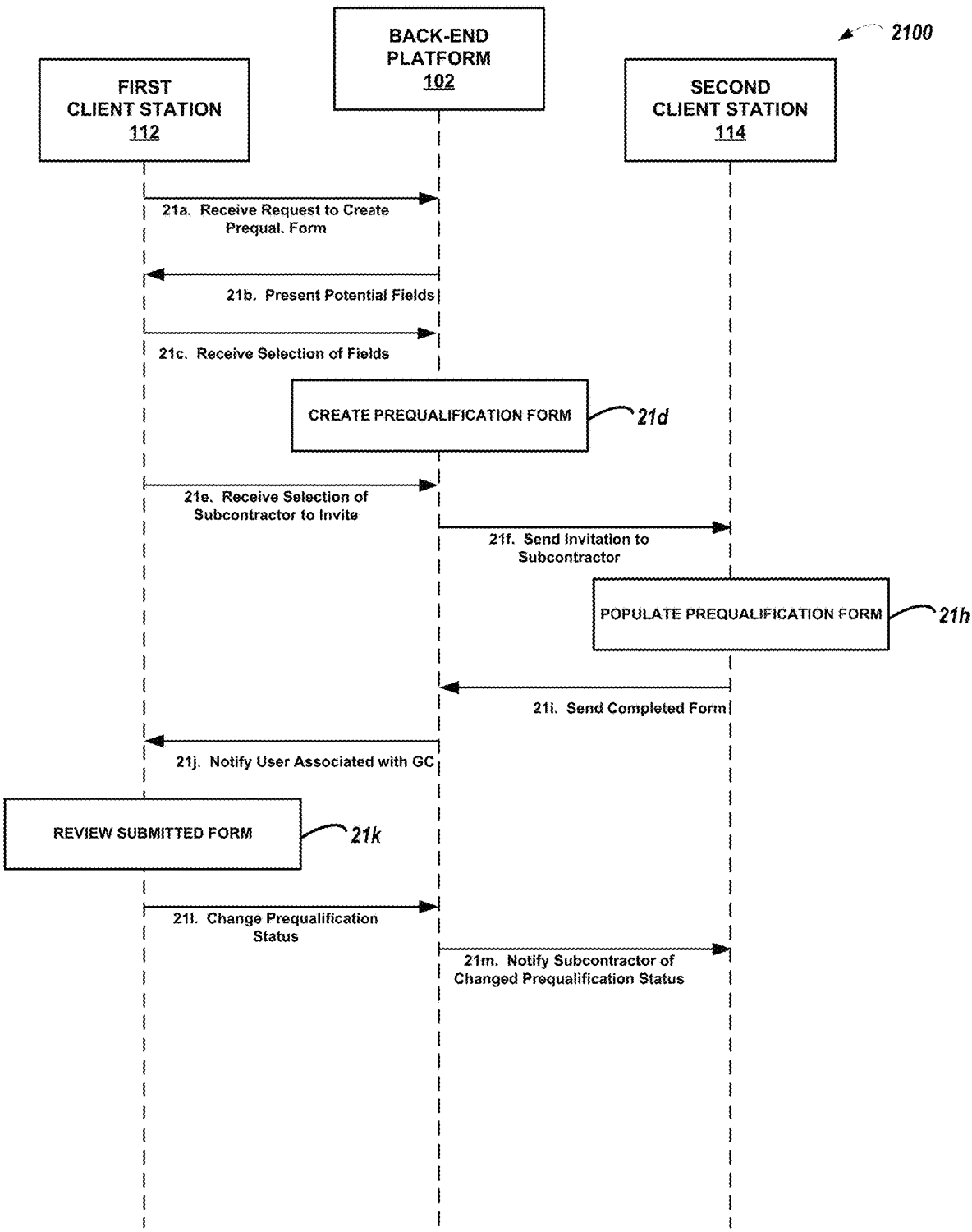
FIG. 21 depicts an example message flow diagram illustrating one example of message flow in accordance with one embodiment.
Figure 22:
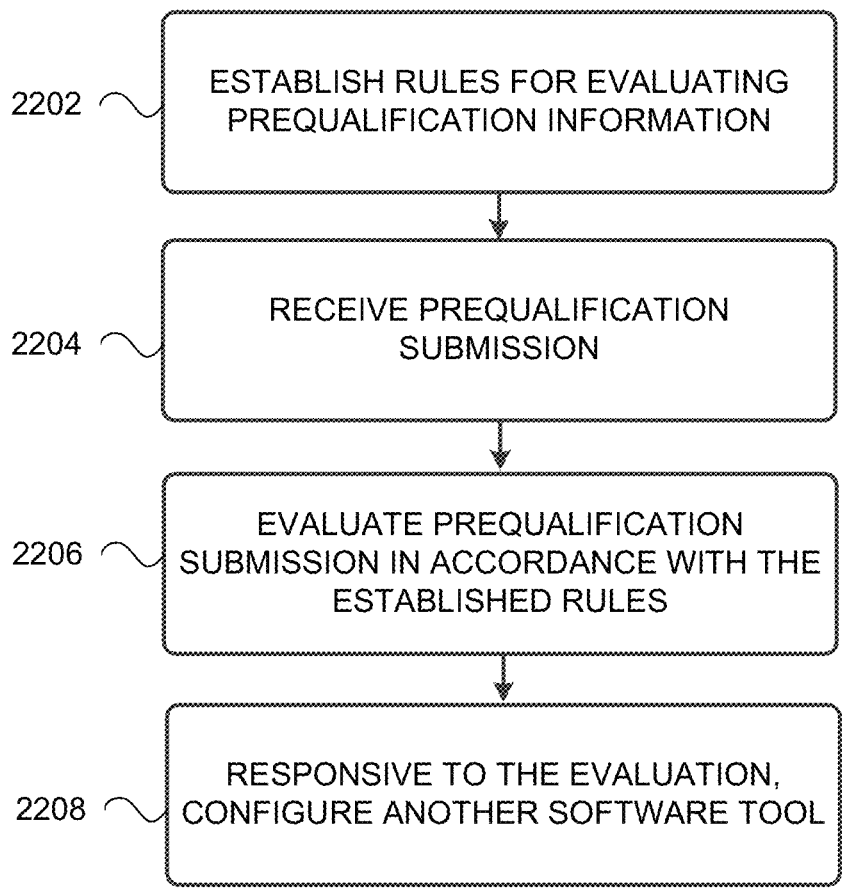
FIG. 22 depicts an example flow diagram illustrating example operations that may be carried out in accordance with one embodiment.

To illustrate some of the aforementioned features and functionality of the disclosed software tool, FIG. 21 depicts an example message flow diagram 2100 and FIG. 22 depicts an example flow diagram 2200 illustrating example sets of operations in which the disclosed software tool may engage, in accordance with example embodiments. In describing the example set of operations illustrated by flow diagrams 2100 and 2200, reference may be made to the previous figures and corresponding description. When reference is made to "a software tool" or "the software tool" engaging in one or more operations, it should be understood that such operations may, in practice, be carried out by one or more computing devices executing one or more instances of the disclosed coordination tool, which in some respects may be embodied as a plug-in to another software tool, or, in other respects, as a web application interface, among other possibilities. In particular, it should be understood that such example operations may be carried out by a computing device, such as computing platform 200 (FIG. 2), which as described above, may serve as one or more of client stations 112, 114, 116 (FIG. 1) and/or back-end platform 102 (FIG. 1). In this respect, it should be further understood that, depending on the implementation, the operations discussed herein below may be carried out entirely by a single computing device, such as one or more of client stations 112, 114, 116 or by back-end platform 102, or may be carried out by a combination of computing devices, with some operations being carried out by back-end platform 102 (such as computational processes and data-access operations) and other operations being carried out by one or more client stations 112 (such as display operations and operations that receive user inputs). However, other arrangements are possible as well.

Turning first to FIG. 21, the first step in the message flow diagram 2100 includes the back-end platform 102 first receiving a request 21a to create a prequalification form. This request may come from a first client station 112, which may, for the purposes of this discussion, be associated with a GC and thus operated by a user associated with a GC. In one example, the first client station 112 may receive a user input via a GUI indicating a desire to create a prequalification form. Responsively, the first client station 112 may transmit this request to the back-end platform 102.

In response to receiving the request 21a, the back-end platform 102 may responsively cause a list of potential fields 21b that may be included within a prequalification form to be presented to the user via client station 112. As examples, back-end platform 102 may cause first client station 112 to present screens similar to those discussed above with respect to FIGS. 3A-C. In turn, the back-end platform may thereafter receive a selection 21c of certain fields to include in a prequalification form, as also described above with respect to FIGS. 3A-C. In response to receiving this selection 21c, the back-end platform may create the prequalification form at block 21d and may store this prequalification form for later use.

Next, first client station 112 may receive via an interface a selection of one or more subcontractors to invite to submit prequalification information via an existing or newly created prequalification form. This selection may be received through the use of screens similar to those discussed above with respect to FIGS. 4A-D. Client station 112 may transmit the selection of the subcontractors to invite to back-end platform 102 via message 21e, and back-end platform may responsively transmit 21f an invite to each selected subcontractor. As described above, this invite 21f may take a form similar to those discussed above with respect to FIGS. 5A-B, although other examples are possible too.

Next at block 21h, a second client station 114, which may, for the purposes of this discussion, be associated with a subcontractor and thus operated by a user associated with the subcontractor, may present an interface that facilitates receiving information to fill out the prequalification form. As described above, the interface may take a form and present screens similar to those discussed above with respect to FIGS. 6A-B, 7A-O, 8A-J, 9A-L, 10A-E, 11A-B, and 12, although other examples are possible too.

Upon providing information requested in the prequalification form, the second client station 114 may transmit 21i the completed form back to the back-end platform 102, whereupon the back-end platform 102 may notify 21j a user associated with the GC that a subcontractor has completed a prequalification form. As described above, the back-end platform may notify a user associated with a GC that a subcontractor has completed a prequalification form by presenting through an interface screens similar to those discussed above with respect to FIG. 13, although other examples are possible.

Continuing at block 21k, a user associated with the GC may utilize first client station 112 to review the submitted prequalification form. To facilitate this review as described above, the first client station 112 may present a through an interface screens similar to those discussed above with respect to FIGS. 14A-C, 15A-B, 16A-B, 17A-B, and 18, although other examples are possible. Through one or more of these screens, the first client device 112 may receive a user input indicating that prequalification status of the subcontractor should be changed. Responsive to receiving such a user input, the first client station may transmit 21*l* an indication of the changed prequalification status to the back-end platform 102, which may transmit a notification 21*m* of the changed prequalification status to the subcontractor. As described above, the back-end platform may make this notification do this by utilizing a screen such as the one depicted in FIG. 19, although other examples are possible.

Turning now to flow diagram 2200 in FIG. 22, at block 2202 the software tool may establish rules for evaluating prequalification information. As mentioned, for instance, a user may establish rules for evaluating certain prequalification information submitted by a subcontractor and may communicate such rules to the software tool at the time the user creates a prequalification form, or perhaps at other times. To facilitate this, for example, the disclosed software tool may present one or more interfaces through which the user may provide various user inputs to establish rules that the software engine may use to evaluate the submitted prequalification information.

The rules may specify a threshold condition and an action to take if the threshold condition is met. For instance, one example of a rule may specify a threshold amount of cash flow for a subcontractor and an action specifying that if prequalification information for a subcontractor indicates that the subcontractor's cash flow is below the threshold amount, then configure an invoicing tool to employ bi-weekly invoicing rather than 45-day invoicing. Another example of a rule may specify a threshold number of safety incidents experienced by the subcontractor during a given timeframe and an action specifying that if prequalification information for a subcontractor indicates that the subcontractor has experienced greater than the threshold number of safety incidents, then configure a Punch Item tool and/or a Daily Log tool to require additional safety actions be completed. Rules may take other forms and/or specify other types of criteria as well.

At block 2204, the software tool may receive prequalification information. As mentioned above, a subcontractor may provide prequalification information via one or more user interfaces provided to a user associated with the subcontractor. The subcontractor may then submit the prequalification form, which causes the prequalification information to be submitted to the software tool for review by one or more users associated with the GC. Other examples of receiving prequalification information may be possible as well.

At block 2206, the software tool may evaluate the prequalification submission in accordance with the established rules. To do this, the software tool may identify the relevant prequalification information for each given rule, compare the respective prequalification information to the threshold or other condition specified a given rule, and determine whether or not an action should be taken responsive to the threshold or other criteria specified in the rule. For instance, for an example rule that specifies a threshold amount of cash flow for a subcontractor and an action specifying that if prequalification information for a subcontractor indicates that the subcontractor's cash flow is below the threshold amount, then configure an invoicing tool to employ bi-weekly invoicing rather than 45-day invoicing—the software tool may identify prequalification information specifying the subcontractor's the cash flow and compare this information to the threshold. When the comparison indicates that subcontractor's cash flow is below the threshold, the software tool may determine to configure the invoicing tool to employ bi-weekly invoicing. The software tool may evaluate the prequalification submission in other ways as well.

At block 2208, the software tool may, responsive to the evaluation conducted at block 2206, configure another software tool. The disclosed software tool may configure another software tool in various ways. For instance, as just one possible example, the disclosed software tool may configure an invoicing tool to employ a type of invoicing (e.g., bi-weekly invoicing). To do this, the disclosed software tool may transmit a configuration message or employ some other directive in order to so configure an invoicing tool. As another possible example, the disclosed software tool may configure a Punch Item tool and/or a Daily Log tool to require additional safety actions be completed. To do this, the disclosed software tool may transmit a configuration message or employ some other directive in order to so configure a Punch Item tool and/or a Daily Log tool. The disclosed software tool may configure other software tools in other manners as well.

VI. CONCLUSION

Example embodiments of the disclosed innovations have been described above. Those skilled in the art will understand, however, that changes and modifications may be made to the embodiments described without departing from the true scope and spirit of the present invention, which will be defined by the claims.

Further, to the extent that examples described herein involve operations performed or initiated by actors, such as "users" or other entities, this is for purposes of example and explanation only. Claims should not be construed as requiring action by such actors unless explicitly recited in claim language.

The invention claimed is:

1. A computing system comprising:
   at least one processor;
   a non-transitory computer-readable medium; and
   program instructions stored on the non-transitory computer-readable medium that are executable by the at least one processor such that the computing system is configured to:
   cause a first client station associated with a first entity to present a first interface for creating prequalification forms for use in prequalifying entities to work on construction projects;
   receive, from the first client station associated with the first entity, a user selection of a given set of one or more predefined fields for inclusion into a new prequalification form for use in prequalifying one or more entities to work on one or more construction projects;
   define a set of one or more rules related to prequalification to apply to prequalification information that is responsive to the given set of one or more predefined fields, each rule of the set of one or more rules specifying a respective prequalification condition for the one or more entities to work on the one or more construction projects;
   responsive to receiving the user selection, establish the new prequalification form;
   receive an identification of a second entity that is invited to seek prequalification via the new prequalification form;
   cause a second client station associated with the second entity to present a second interface for submitting prequalification information responsive to the given set of one or more predefined fields included within the new prequalification form;

receive, from the second client station associated with the second entity, a completed submission of the new prequalification form comprising a given set of prequalification information for the second entity that is responsive to the given set of one or more predefined fields included within the new prequalification form;

after receiving the completed submission, evaluate the given set of prequalification information for the second entity that is responsive to the given set of one or more predefined fields in accordance with the set of one or more rules;

implement a change to a configuration of an external software tool for managing the one or more construction projects in response to the evaluation of the given set of prequalification information revealing that one or more of the rules of the set of one or more rules are not met;

cause a third client station associated with a third entity to present a third interface for reviewing the given set of prequalification information for the second entity that is responsive to the given set of one or more predefined fields, wherein the third entity is different than the second entity;

receive, from the third client station associated with the third entity, user input related to a review by the third entity of the given set of prequalification information for the second entity that is responsive to the given set of one or more predefined fields;

based at least in part on the user input related to the review by the third entity of the given set of prequalification information for the second entity that is responsive to the given set of one or more predefined fields, assign a prequalification status to the second entity; and cause a fourth client station associated with the second entity to present an indication of the prequalification status for the second entity.

2. The computing system of claim 1, wherein the program instructions stored on the non-transitory computer-readable medium are further executable by the at least one processor such that the computing system is further configured to:
based on the evaluation, flag the completed submission for further review.

3. The computing system of claim 1, wherein receiving, from the third client station associated with the third entity, the user input related to the review by the third entity comprises receiving one or more user selections marking at least a portion of the given set of prequalification information as reviewed.

4. The computing system of claim 1, wherein receiving, from the third client station associated with the third entity, the user input related to the review by the third entity comprises receiving a user input confirming a given prequalification status to be assigned to the second entity, and wherein assigning the prequalification status to the second entity comprises assigning the given prequalification status to the second entity in response to receiving the user input confirming the given prequalification status to be assigned to the second entity.

5. The computing system of claim 1, wherein the external software tool is selected from the group consisting of a punch-list software tool that facilitates management of punch items, a daily-log software tool that facilitates management of daily construction activities, an invoicing software tool that facilitates management of invoicing, a commitments software tool that facilitates management of contracts and purchase orders, and a change-orders software tool that facilitates management of change orders.

6. The computing system of claim 1, wherein configuring the external software tool based on the evaluation comprises automatically configuring the external software tool based on the evaluation.

7. The computing system of claim 1, wherein the program instructions stored on the non-transitory computer-readable medium are further executable by the at least one processor such that the computing system is further configured to:
cause a fifth client station associated with a fifth entity to present a fifth interface for reviewing and approving the change to the configuration of the external software tool;

receiving, from the fifth client station, a user input indicating approval of the change; and implementing the change to the configuration of the external software tool after receiving the user input indicating approval of the change.

8. The computing system of claim 1, wherein each rule of the set of one or more rules specifies an action to take if the prequalification information that is responsive to the given set of one or more predefined fields indicates that the respective prequalification condition for the one or more entities to work on the one or more construction projects is met.

9. The computing system of claim 1, wherein each rule of the set of one or more rules is (i) defined based on input from a general contractor, (ii) predefined by a provider of a software tool for prequalifying entities to work on construction projects, and/or (iii) derived based on an analysis of historical data.

10. The computing system of claim 9, wherein the second entity has a preexisting account with the provider of the software tool for prequalifying entities to work on construction projects, and wherein the historical data is associated with the preexisting account.

11. The computing system of claim 1, wherein the program instructions stored on the non-transitory computer-readable medium are further executable by the at least one processor such that the computing system is further configured to:
assign to the third entity a task of reviewing a first portion of the given set of prequalification information for the second entity that is responsive to the given set of one or more predefined fields; and assign to a fifth entity a task of reviewing a second potion of the given set of prequalification information for the second entity that is responsive to the given set of one or more predefined fields, wherein the fifth entity is different than the third entity.

12. The computing system of claim 11, wherein the program instructions stored on the non-transitory computer-readable medium are further executable by the at least one processor such that the computing system is further configured to:
assign to the third entity the task of reviewing the first portion of the given set of prequalification information for the second entity that is responsive to the given set of one or more predefined fields based on first user input; and assign to the fifth entity the task of reviewing the second potion of the given set of prequalification information for the second entity that is responsive to the given set of one or more predefined fields based on second user input.

13. The computing system of claim 11, wherein the program instructions stored on the non-transitory computer-readable medium are further executable by the at least one processor such that the computing system is further configured to:
assign to the third entity, automatically and based on first preestablished criteria, the task of reviewing the first portion of the given set of prequalification information for the second entity that is responsive to the given set of one or more predefined fields based on first user input; and
assign to the fifth entity, automatically and based on second preestablished criteria, the task of reviewing the second potion of the given set of prequalification information for the second entity that is responsive to the given set of one or more predefined fields based on second user input.

14. The computing system of claim 1, wherein the second client station is the same as the fourth client station.

15. The computing system of claim 1, wherein the first client station is the same as the third client station.

16. The computing system of claim 1, wherein the change to the configuration of the external software tool alters the prequalification status for the second entity.

17. A method comprising:
causing a first client station associated with a first entity to present a first interface for creating prequalification forms for use in prequalifying entities to work on construction projects;
receiving, from the first client station associated with the first entity, a user selection of a given set of one or more predefined fields for inclusion into a new prequalification form for use in prequalifying one or more entities to work on one or more construction projects;
defining a set of one or more rules related to prequalification to apply to prequalification information that is responsive to the given set of one or more predefined fields, each rule of the set of one or more rules specifying a respective prequalification condition for the one or more entities to work on the one or more construction projects;
responsive to receiving the user selection, establishing the new prequalification form;
receiving an identification of a second entity that is invited to seek prequalification via the new prequalification form;
causing a second client station associated with the second entity to present a second interface for submitting prequalification information responsive to the given set of one or more predefined fields included within the new prequalification form;
receiving, from the second client station associated with the second entity, a completed submission of the new prequalification form comprising a given set of prequalification information for the second entity that is responsive to the given set of one or more predefined fields included within the new prequalification form;
after receiving the completed submission, evaluating the given set of prequalification information for the second entity that is responsive to the given set of one or more predefined fields in accordance with the set of one or more rules;
implementing a change to a configuration of an external software tool for managing the one or more construction projects in response to the evaluation of the given set of prequalification information revealing that one or more of the rules of the set of one or more rules are not met;
causing a third client station associated with a third entity to present a third interface for reviewing the given set of prequalification information for the second entity that is responsive to the given set of one or more predefined fields, wherein the third entity is different than the second entity;
receiving, from the third client station associated with the third entity, user input related to a review by the third entity of the given set of prequalification information for the second entity that is responsive to given set of one or more the predefined fields;
based at least in part on the user input related to the review by the third entity of the given set of prequalification information for the second entity that is responsive to the given set of one or more predefined fields, assigning a prequalification status to the second entity; and
causing a fourth client station associated with the second entity to present an indication of the prequalification status for the second entity.

18. The method of claim 17, further comprising:
based on the evaluation, flagging the completed submission for further review.

19. The method of claim 17, wherein receiving, from the third client station associated with the third entity, the user input related to the review by the third entity comprises receiving one or more user selections marking at least a portion of the given set of prequalification information as reviewed.

20. The method of claim 17, wherein receiving, from the third client station associated with the third entity, the user input related to the review by the third entity comprises receiving a user input confirming a given prequalification status to be assigned to the second entity, and wherein assigning the prequalification status to the second entity comprises assigning the given prequalification status to the second entity in response to receiving the user input confirming the given prequalification status to be assigned to the second entity.

21. A non-transitory computer-readable storage medium having program instructions stored thereon that are executable to cause a computing system to:
cause a first client station associated with a first entity to present a first interface for creating prequalification forms for use in prequalifying entities to work on construction projects;
receive, from the first client station associated with the first entity, a user selection of a given set of one or more predefined fields for inclusion into a new prequalification form for use in prequalifying one or more entities to work on one or more construction projects;
define a set of one or more rules related to prequalification to apply to prequalification information that is responsive to the given set of one or more predefined fields, each rule of the set of one or more rules specifying a respective prequalification condition for the one or more entities to work on the one or more construction projects;
responsive to receiving the user selection, establish the new prequalification form;
receive an identification of a second entity that is invited to seek prequalification via the new prequalification form;

cause a second client station associated with the second entity to present a second interface for submitting prequalification information responsive to the given set of one or more predefined fields included within the new prequalification form;

receive, from the second client station associated with the second entity, a completed submission of the new prequalification form comprising a given set of prequalification information for the second entity that is responsive to the given set of one or more predefined fields included within the new prequalification form;

after receiving the completed submission, evaluate the given set of prequalification information for the second entity that is responsive to the given set of one or more predefined fields in accordance with the set of one or more rules;

implement a change to a configuration of an external software tool for managing the one or more construction projects in response to the evaluation of the given set of prequalification information revealing that one or more of the rules of the set of one or more rules are not met;

cause a third client station associated with a third entity to present a third interface for reviewing the given set of prequalification information for the second entity that is responsive to the given set of one or more predefined fields, wherein the third entity is different than the second entity;

receive, from the third client station associated with the third entity, user input related to a review by the third entity of the given set of prequalification information for the second entity that is responsive to the given set of one or more predefined fields;

based at least in part on the user input related to the review by the third entity of the given set of prequalification information for the second entity that is responsive to the given set of one or more predefined fields, assign a prequalification status to the second entity; and cause a fourth client station associated with the second entity to present an indication of the prequalification status for the second entity.

22. The non-transitory computer-readable storage medium of claim 21, wherein the program instructions are further executable to:

based on the evaluation, flag the submission for further review.

* * * * *